United States Patent
Sandoval

(10) Patent No.: US 11,991,235 B2
(45) Date of Patent: May 21, 2024

(54) ADAPTIVE ENERGY SYSTEM UTILIZING QUALITY OF SERVICE AND QUALITY OF EXPERIENCE METRICS

(71) Applicant: Comcast Cable Communications, LLC, Philadelphia, PA (US)

(72) Inventor: Francis Sandoval, Denver, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 452 days.

(21) Appl. No.: 15/717,556

(22) Filed: Sep. 27, 2017

(65) Prior Publication Data
US 2019/0098067 A1    Mar. 28, 2019

(51) Int. Cl.
| | | |
|---|---|---|
| H04L 65/80 | (2022.01) | |
| H02J 13/00 | (2006.01) | |
| H04L 12/12 | (2006.01) | |
| H04L 47/70 | (2022.01) | |
| H04L 65/1083 | (2022.01) | |
| H04L 65/61 | (2022.01) | |
| H04L 65/612 | (2022.01) | |
| H04N 21/647 | (2011.01) | |
| H02J 3/00 | (2006.01) | |
| H04W 40/08 | (2009.01) | |

(52) U.S. Cl.
CPC ........ *H04L 65/80* (2013.01); *H02J 13/00017* (2020.01); *H02J 13/00024* (2020.01); *H02J 13/00026* (2020.01); *H04L 12/12* (2013.01); *H04L 47/82* (2013.01); *H04L 65/1086* (2013.01); *H04L 65/612* (2022.05); *H04N 21/64738* (2013.01); *H04N 21/64769* (2013.01); *H02J 3/00* (2013.01); *H02J 2203/20* (2020.01); *H04L 65/61* (2022.05); *H04W 40/08* (2013.01)

(58) Field of Classification Search
CPC ......... H04L 47/82; H04L 65/80; H04L 12/12; H04L 65/4069; H04L 65/61; H04N 21/64738; H04N 21/64769; H02J 3/00
See application file for complete search history.

(56) References Cited

U.S. PATENT DOCUMENTS

| | | | |
|---|---|---|---|
| 8,463,933 B2 * | 6/2013 | Harrang | H04L 45/00 709/233 |
| 11,373,252 B1 * | 6/2022 | Moses | G06Q 10/06393 |

(Continued)

FOREIGN PATENT DOCUMENTS

WO    WO-2017139788 A1 *    8/2017    ......... H04L 12/2801

OTHER PUBLICATIONS

Engineering Committee, Energy Management Subcommittee, Adaptive Power System Interface Specification (APSIS), 2015, pp. 1-26, Society of Cable Telecommunications Engineers, Inc., Exton, PA.

*Primary Examiner* — Boris D Grijalva Lobos
*Assistant Examiner* — Timothy Sowa
(74) *Attorney, Agent, or Firm* — Banner & Witcoff, Ltd.

(57) ABSTRACT

Systems and methods are disclosed for optimizing resources while maintaining user experiences. Disclosed examples include an adaptive energy system whereby resource use can be optimized by influencing a communication path to utilize a subset of available resources in an efficient manner. Quality metrics are monitored such that optimization measures are implemented only if they do not negatively impact user experiences beyond a threshold.

26 Claims, 10 Drawing Sheets

(56) References Cited

U.S. PATENT DOCUMENTS

| | | | | |
|---|---|---|---|---|
| 2007/0263653 | A1* | 11/2007 | Hassan | H04L 5/0053 |
| | | | | 370/437 |
| 2008/0273591 | A1* | 11/2008 | Brooks | H04N 21/6118 |
| | | | | 375/240.01 |
| 2011/0093605 | A1* | 4/2011 | Choudhury | H04L 65/4084 |
| | | | | 709/231 |
| 2011/0299549 | A1* | 12/2011 | Diab | H04L 12/12 |
| | | | | 370/401 |
| 2012/0066735 | A1* | 3/2012 | Pham | H04N 21/64723 |
| | | | | 725/116 |
| 2012/0271475 | A1* | 10/2012 | Wang | H02J 13/00034 |
| | | | | 700/295 |
| 2012/0278476 | A1* | 11/2012 | Agrawal | H04L 67/5683 |
| | | | | 709/224 |
| 2013/0232265 | A1* | 9/2013 | Bourgart | H04J 14/0227 |
| | | | | 709/224 |
| 2014/0010282 | A1* | 1/2014 | He | H04N 19/156 |
| | | | | 375/240.02 |
| 2015/0287057 | A1* | 10/2015 | Baughman | H04L 41/147 |
| | | | | 705/7.31 |
| 2015/0288571 | A1* | 10/2015 | Baughman | H04L 41/147 |
| | | | | 703/21 |
| 2015/0288573 | A1* | 10/2015 | Baughman | H04L 41/147 |
| | | | | 706/52 |
| 2015/0373645 | A1* | 12/2015 | Mishra | H04W 52/0212 |
| | | | | 370/311 |
| 2021/0142295 | A1* | 5/2021 | Lalonde | G06Q 30/0633 |

* cited by examiner

ADAPTIVE ENERGY SYSTEM UTILIZING QUALITY OF SERVICE AND QUALITY OF EXPERIENCE METRICS

BACKGROUND

Energy optimization is known to be implemented in a variety of systems. However, current methods of energy optimization do not sufficiently address the needs of content service and delivery systems that may comprise many devices across a signal path. In some situations, energy optimization techniques may degrade performance and/or user experience, such as causing an unclear or interrupted consumption of video content or other data. But user experiences need to be maintained at particular quality levels, even during times when the provider or another entity may also employ energy optimization. Thus, there remains an ever-present need for improved energy optimization while maintaining a user experience at satisfactory levels.

SUMMARY

The following summary is for illustrative purposes only, and is not intended to limit or constrain the detailed description. The following summary merely presents various described aspects in a simplified form as a prelude to the more detailed description provided below.

In one aspect, an adaptive energy system is disclosed that allows an infrastructure to deploy smart energy management while maintaining service quality that users demand. Disclosed examples factor in quality measurements to preserve the user experience while optimizing energy usage. For example, a user with a fixed energy budget—an energy budget implemented by a service provider, the user, or combination thereof—that wants to stream a movie in High Definition could be presented with the option to do so by reducing power consumption in other areas, such as air conditioning power, dimming lights, turning off a dishwasher, or changing usage of any other device that consumes energy at the premise. Alternatively, the user could be presented with the option of maintaining or increasing its energy usage in one or more connected appliances by selecting to watch the same movie in Standard Definition instead of High Definition. As another example, upon detecting a decrease in quality of delivered content, such as caused by an increase in demand for service in one region across a nationwide system for streaming movies, the system can reallocate its resources in that region, such as by dedicating more of its servers for the region. Similarly, upon detecting an increase in quality of delivered content above an upper threshold level, such as resulting from a low demand for service in a region, the same nationwide system could reallocate its resources by shifting server usage from the low demand region to a higher demand region in an effort to increase quality in the higher demand region while maintaining quality in a low demand region at least above a lower threshold level. In this way, users in multiple regions could stream movies at acceptable quality levels across a system, even during periods of higher demand in different regions. An adaptive energy system as disclosed herein can be applied to a wide variety of service and/or content delivery systems in order to maintain satisfactory service and experience levels throughout each user's use of the system, while also conserving energy usage.

In another aspect, Quality of Service ("QoS") and Quality of Experience ("QoE") measurements can be factored in to preserve the user experience while optimizing energy usage, which can include minimizing or maintaining energy usage. Quality of Service measurements are used to create QoS metrics and pertain to service availability. In some examples, QoS relates to access to a service, such as whether a user is able to access requested content and associated data as a threshold matter. Quality of Experience measurements are used to create QoE metrics and pertain to the user experience of a service. In some examples, QoE relates to a user experience once access to content is obtained, such as whether the content a user views or hears is delivered timely and with sufficient clarity, e.g., bitrate, error rate, and noise, for an acceptable user experience. In some examples, QoS metrics can provide an indication of system-level performance, and QoE metrics can provide an indication of performance at a particular location within a system, such as delivering High Definition television to a user's home or business so that a user can satisfactorily access all channels (e.g., maintaining QoS) and view programs in HD without pixelation, delay, noise, or other reduction in video or audio quality (e.g., maintaining QoE).

In another example, an adaptive energy system disclosed herein can accommodate changes in access to or costs of resources, such as due to weather and/or regional energy demand fluctuations, resulting in reduced impact on the system and its users. For example, if a southern region of the country is experiencing a heat wave, or a northern region is experiencing a deep freeze, causing a higher than average energy consumption (and as a result a higher cost-per-kilowatt-hour of electricity), the system herein may react by transferring some of the content distribution responsibilities from servers or other equipment in those parts of the country to other parts of the country that are using less energy. The system in the region of the country experiencing energy surges may also scale back energy usage of its servers or other equipment for some services (e.g., delivery of streaming content), including intentionally degrading performance while still maintaining the performance above a threshold. Resource reallocations may be a temporary measure, and after the heat wave or cold front passes (or after energy costs come down), the services may be restored to normal. In addition, the system can predict changes in the system, such as changes in access to or costs of resources due to weather changes. For example, if a heat wave or cold front is predicted to occur in a region hours, days, or weeks ahead of time, an adaptive energy system disclosed herein can respond to the weather forecast by reallocating resource usage across the system in advance of the weather change to provide a resource surplus in the region that will accommodate resource needs during the changed weather (e.g., power backup via batteries, prioritization of servers for use in advance of the anticipated needs during the heat wave). In a content delivery system, content such as Video on Demand ("VOD") content can be delivered and stored in advance of an anticipated resource shortage or cost increase, such as due to weather and/or regional energy demand fluctuations.

In some examples, energy usage can be minimized at any service demand level, while maintaining a quality of delivered services, by influencing data pathways to utilize a subset of available resources. For example, a request for content from a content device, such as a request for streaming video via a user's set-top box, can be received and processed, and the content can be transmitted or received via a network. Quality data indicative of a quality of the content received, e.g., the video and audio for output by a user's television, can be determined. Based on the quality data, such as whether the streaming video is delivered with a clear picture and an accurate and synchronized sound, a communication path and an energy consumption level can be determined for particular communication or user devices in the network. In some examples, media servers can be shared across a nationwide system and allocated based on regional demand levels to ensure that quality of services are maintained at a threshold. Free or partially used resources, such as signal amplifiers at unused facilities (e.g., beach resorts during winter) can be instructed to enter power saving states, thereby conserving energy for use elsewhere in a system to ensure quality of services are maintained at a threshold. By closely monitoring QoS and QoE metrics while sharing resources and conserving energy, and backing off energy savings measures or requesting more system resources when signs of user experience problems are detected at a location (e.g., activating more devices to maintain HD video delivery during system wide demand surges), energy optimization applications can be implemented without negatively impacting the user experience.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

Figure 1:
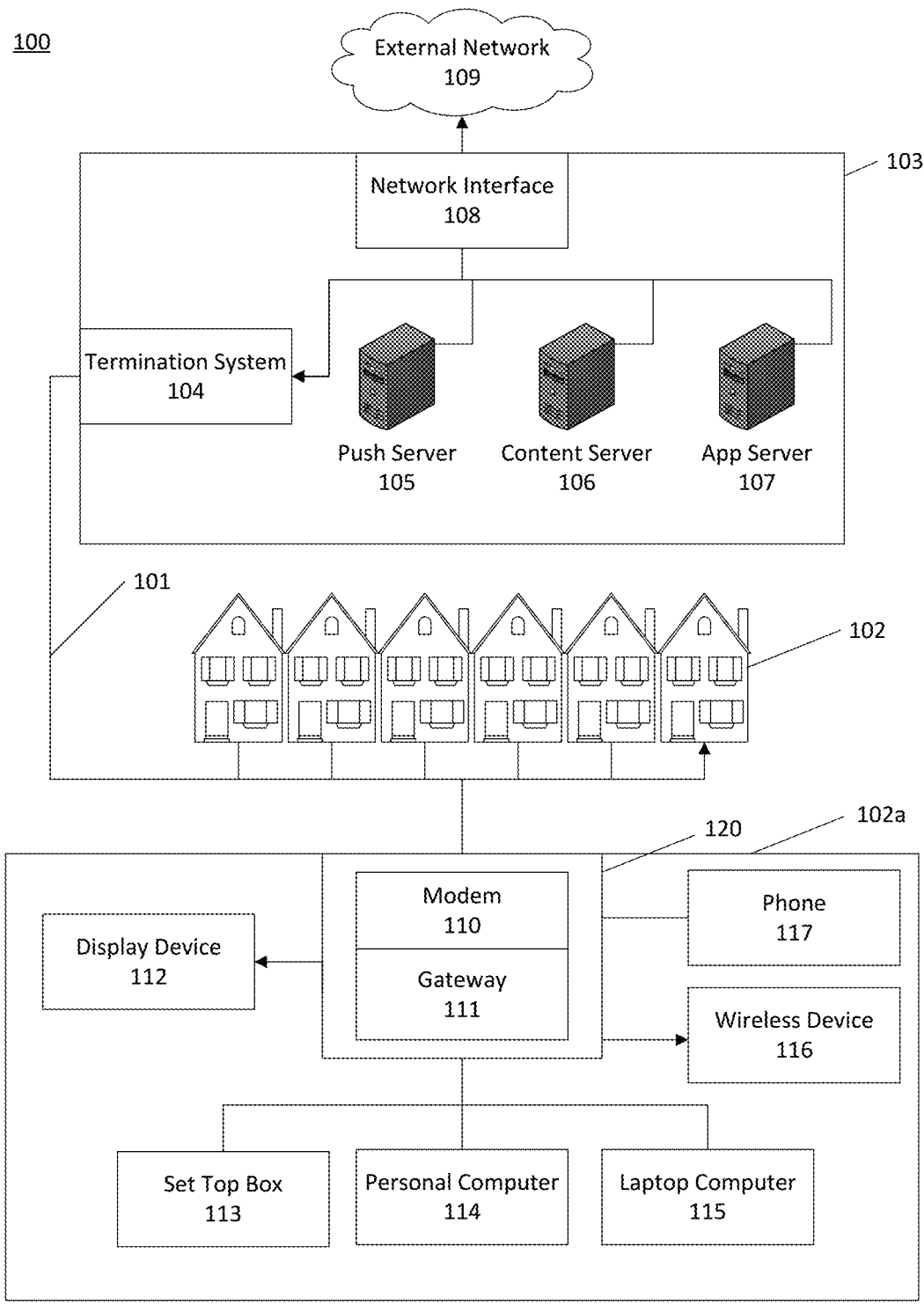
FIG. 1 shows a high-level diagram of an exemplary system in which various features described herein may be used.

In the following description of the various examples, reference is made to the accompanying drawings identified above, which form a part hereof, and in which is shown by way of illustration various examples in which various aspects of the disclosure may be practiced. Other examples may be utilized, and structural and functional modifications may be made, without departing from the scope discussed herein. Various aspects are capable of other examples and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Various features are described herein that allow for the conservation of energy and more efficient use of resources while maintaining a satisfactory user experience in a content delivery system. For example, systems and methods are described in an environment where energy management applications consume real-time data indicating energy consumption, service demand, and metrics for QoS and QoE. This data is then used to optimize energy usage and resource allocation while maintaining a satisfactory user experience. Optimization described herein is particularly advantageous for a cable infrastructure, although it may also benefit and be applied to any other infrastructure.

Quality of Service and Quality of Experience both refer to metrics that can be used to monitor service delivery, such as a TV viewing experience. QoS and QoE metrics may include any number of individual measures, such as packet delivery latencies, error rates, and measures of other system behaviors. Formulas may be used to derive a quality score that in turn can be used as input to other systems. Some QoS and QoE metrics may be weighted more heavily than others, and some may be included in an analysis while others may be excluded. Thresholds can be established for any number of QoS and QoE metrics to indicate whether certain changes are to be made in the system, such as reconfiguring a signal path or increasing or decreasing power to a device. Formulas and thresholds can be static or dynamic, and can change at various times or upon certain events. Exemplary measures for QoS and QoE metrics are included in Table 2 and are addressed further below.

Applications can measure the energy usage and identify resource allocations in a system, from a single device to an entire network topology of devices. Energy usage and resource allocations of the infrastructure can be influenced through a variety of mechanisms in order to provide optimization. As one example discussed further herein, use of high speed data or video on cable plants can vary widely throughout the day, e.g., from peak usage in the evening to very low in the middle of the night. However, equipment required for these transmissions often remains powered on steady state during both peak and low usage periods. An adaptive energy system as disclosed herein provides the ability to modulate the energy usage as the service demand changes, thereby conserving energy. For example, during low usage periods such as overnight, equipment can be powered down or placed in a sleep mode or other mode of reduced energy. Additionally or alternatively, during such low periods, data rates can be reduced along with a reduction in power usage in view of the decrease in the need for real-time data relative to peak demand times. In addition, applications may be made aware of and be able to detect certain measures of the service and experience, because energy optimization can be undesirable if it negatively affects the user experience. For example, instances of service disruptions and/or reduction in data rates can be detected and used to determine whether energy optimization measures remain acceptable or should be adjusted to ensure satisfactory service and experience levels for each user. Accordingly, an adaptive energy system as disclosed herein optimizes energy consumption while maintaining the user experience.

FIG. 1 illustrates an example of a distribution network 100 for content (e.g., data, video, audio, media, information, services, and/or combinations thereof) on which many of the various features described herein may be implemented. Network 100 may be any type of information distribution network, such as satellite, telephone, cellular, wired, or wireless. One example may be an optical fiber network, a coaxial cable network or a hybrid fiber/coax (HFC) distribution network. Such networks 100 use a series of interconnected communication lines 101 (e.g., coaxial cables, optical fibers, or wireless) to connect multiple premises 102 (e.g., businesses, homes, or consumer dwellings) to a central office or headend 103 (e.g., a central office, headend, processing facility, or combination thereof). The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, or amplifiers, to help convey the signal clearly, but in general each split introduces a bit of signal degradation. The lines 101 may include any type of device used to transmit or receive content, including but not limited to, a gateway, server, router, optical node, backbone, and fiber ring. Portions of the lines 101 may also be implemented with fiber-optic cable, while other portions may be implemented with coaxial cable, other lines, or wireless communication paths. The lines 101 may include any device from one or more of a backoffice network, backbone network, transport network, access network, and user network.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, or geographic area). In some examples, homes connected to a termination system (TS), such as a modem termination system (MTS), may form a local premises access network.

The central office 103 may include a termination system (TS) 104, such as a cable modem termination system (CMTS) in an example of a HFC-type network, which may be a computing device configured to manage communications between devices on the network of lines 101 and backend devices such as servers 105-107 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place content on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, Internet Protocol (IP) networks having Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones (e.g., phone 117).

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in or near the premises 102. This content may be, for example, video on demand movies, television programs, songs, services, information, text listings, or closed caption data. In some examples, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The central office 103 may also include one or more application servers 107. An application server 107 may be a computing device configured to offer any desired service, and may run various languages and operating systems (e.g., servlets and JSP pages running on TOMCAT/MySQL, OSX, BSD, UBUNTU, REDHAT, HTML5, JAVASCRIPT, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102. The central office 103 may also include a backoffice network, which may include business and operation support systems and a network operations center. The central office 103 may also include one or more server farms, gateways, routers, backbones, master headend, national data center, regional head end, regional data center, Converged Cable Access Platform device ("CCAP"), or a Network Interface Device ("NID").

An example premises 102a may include a modem 110 (or another receiver and/or transmitter device suitable for a particular network), which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111, such as a combined modem and gateway interface device 120. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to other computing devices, including those in or remote to the home (e.g., user devices), such as televisions or other display devices 112 (e.g., televisions, media players, or monitors), additional STBs or DVRs 113, personal computers 114, laptop computers 115, wireless devices 116 (e.g., wireless laptops, netbooks, tablets, media players, monitors, DVRs, mobile phones, mobile televisions, or personal digital assistants (PDA)), and any other desired wired or wireless devices. In particular, these devices can include any type of content device configured to receive, decode, demodulate, decrypt, transmit, display, play, record, and/or store content, such as audio, video, data, or any combination thereof. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and any other interface.

Figure 2:
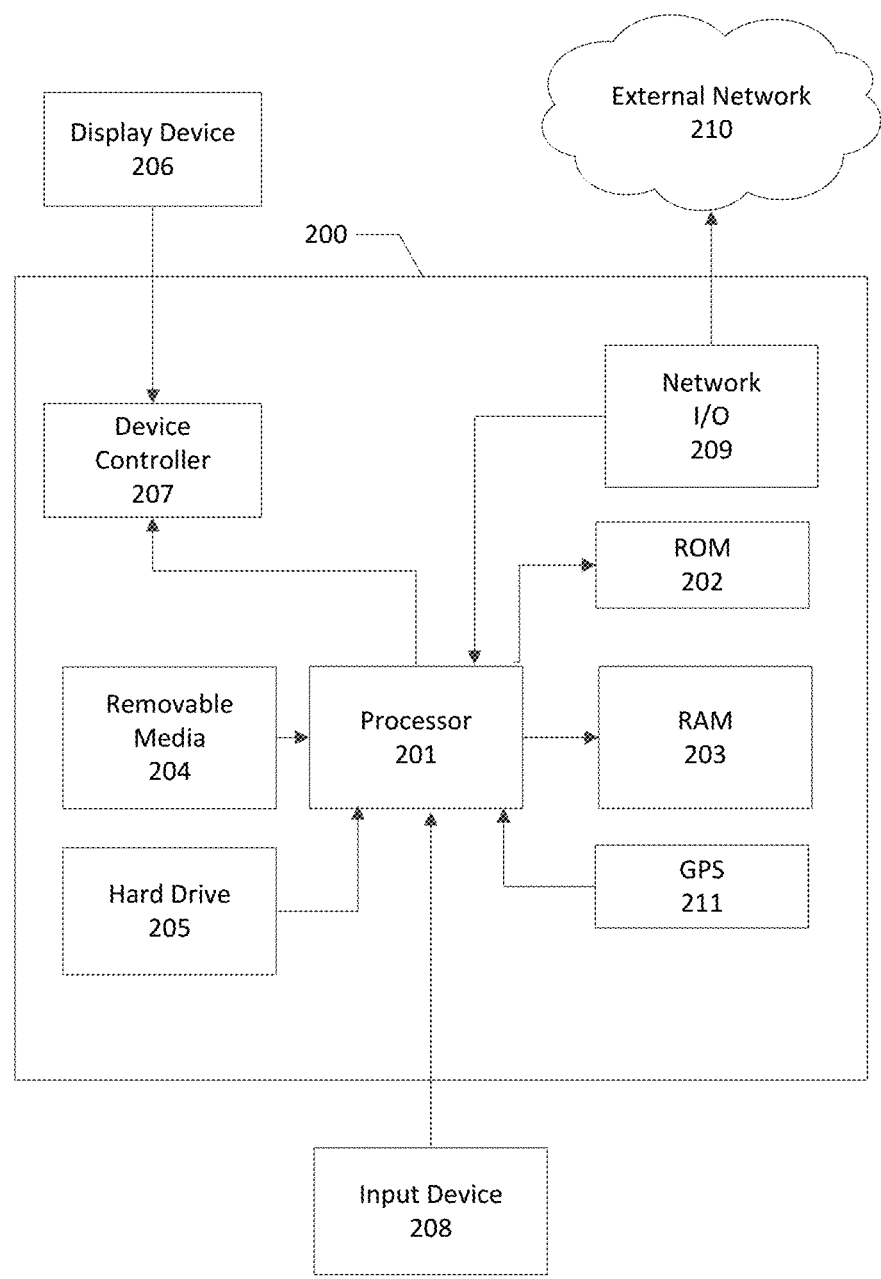
FIG. 2 shows a diagram of an adaptive energy system that can be implemented in connection with a system such as described herein.

FIG. 2 illustrates a diagram of a device 200 in which many of the various features described herein may be implemented. In an example, the device 200 can comprise a set-top box configured to receive content from a network 210 (e.g., central office 103 or external network 109 via lines 101 in FIG. 1) for display on a display device 206, such as a television, monitor, computer, or phone (e.g., smartphone). Network 210 can include any device in user premise 102a, on lines 101, at central office 103, and/or in external network 109. In an example, input device 208 can include a remote control configured to control the device 200, such as one or more of a set-top box, a television, or other device (e.g., at a user premise 102a). The processor 201 receives commands that can include a control stream, e.g., from input device 208, to select content received from the network 210, via network input/output 209. The input device 208 can include any wired or wireless form of communications by a user to control the device 200. For example, the input device 208 can include a remote control, voice command, keypad, or wired or wireless connection to another control device (e.g., remote control, set-top box, DVR, laptop, desktop computer, tablet, or phone). The processor 201 commands a device controller 207 to direct the display of the content on the display device 206. The processor 201 can perform the analysis of received content to create and update QoS and QoE metrics in the manner described herein. Metrics can be stored in memory, which can comprise any type of memory, such as ROM 202, RAM 203, removable media 204, or hard drive 205. This memory can also provide instructions to processor 201 for operations described herein and/or store content for analysis by processor 201 or for display by display device 206.

In some examples, the device 200 can include any device described above regarding FIG. 1, any content device or display device described further below, or any combination thereof. One or more devices described above regarding FIG. 1 can each be implemented as one of a plurality of devices 200. Input device 208 can include an input from a source external to the device 200 (e.g., a remote control), internal to the device (e.g., a keyboard for a computer), or both (e.g., a user interface on a smartphone that can display content or control a television or monitor to display content). Input device 208 can also include any type of input control, such as one or more remote controls (e.g., infrared, Bluetooth, motion sensor-enabled, or voice-controlled), user-selectable switches (e.g., buttons on a set-top box), USB or other ports, connections to other devices, or any other input control. The device 200 can also include a global position system GPS 211 that can provide location information to the processor 201. In some examples, the device 200 can include a display, the device 200 can be coupled to an external display device 206 (as shown in FIG. 2), or both. For example, the device 200 can include a mobile phone having a display, a set-top box coupled to a television having a display, or a laptop both having a display and configured to couple to an external monitor or television having a display. One or more portions of the device 200, including any of 201-209 and 211, can be included at one or more locations (e.g., at central office 103, external network 109, or premise 102) or in one or more devices (e.g., 105-107 and 110-117). In some examples, the processor 201 can provide output data to an external network 210.

Figure 3:
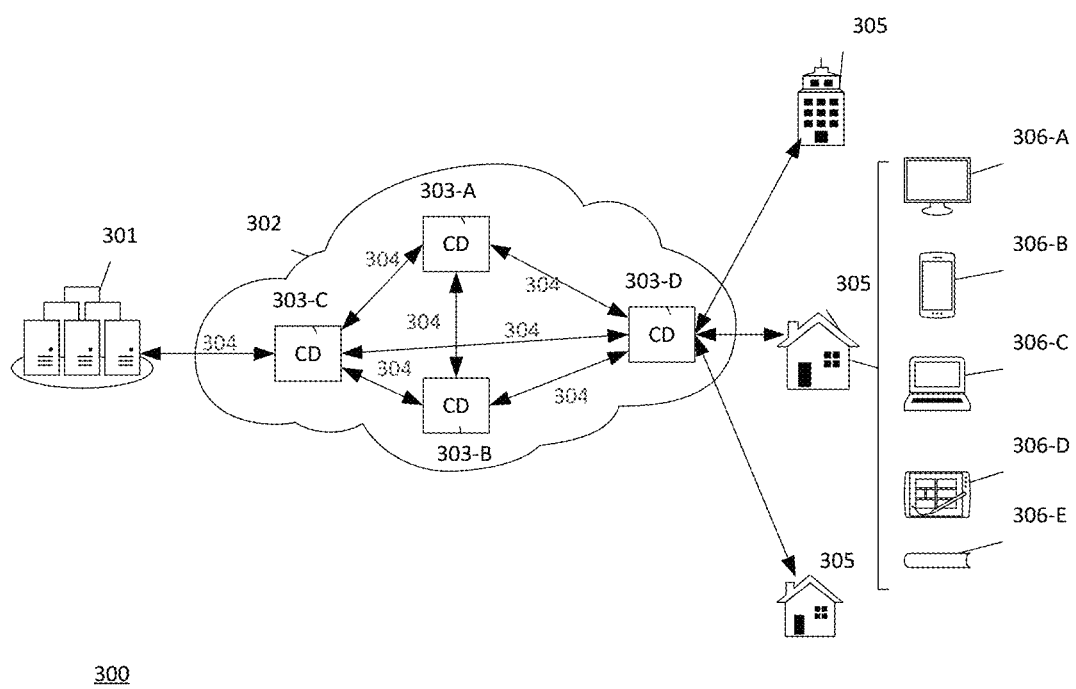
FIG. 3 shows a high-level diagram of an exemplary system similar to FIG. 1, with additional details of a distribution network, in which various features described herein may be used.

FIG. 3 illustrates an example of a content delivery system or network 300, similar to network 100 in FIG. 1, in which many of the various features described herein may be implemented. The content delivery system 300 may utilize any type of distribution network 302 (e.g., including lines 101 in FIG. 1), for distributing content from a content source 301 to a content device 306. The content source 301 may include any source of content distribution, such as central office 103 in FIG. 1, including, e.g., headend, back office network, data center, hub facilities, servers, and external systems. Examples of distribution networks 302 may include, but are not limited to, an optical fiber network, a co-axial cable network, a hybrid fiber/coax distribution network, a satellite network, a telephone network, a cellular network, a wireless network, or any combination thereof. The distribution network 302 may include any number of a plurality of communication devices 303 (shown as 303-A to 303-D and referred to herein both individually and collectively as 303). The communication devices 303 may include any type of device or group of devices used for transmitting or receiving communications in the content delivery system 300 (e.g., including devices at premises 102a and/or on lines 101 in FIG. 1), such as a gateway, server, router, optical node, backbone, fiber ring, amplifier (e.g., Radio Frequency ("RF") amplifier), CMTS, CCAP, NID, digital video recorder, set-top box, and any combination thereof. Each of the communication devices 303 may communicate with one or more of the other communication devices 303 using a series of interconnected communication links 304 (e.g., co-axial cables, optical fibers, or wireless, including lines 101 in FIG. 1), to connect one or more content devices 306 (shown as 306-A to 306-E and referred to herein both individually and collectively as 306) at various premises 305 (e.g., businesses, homes, or consumer dwellings) to the distribution network 302. The content devices 306 may include any type of device used to access content (including 110-117 in FIG. 1), such as a television (e.g., 306-A), smart phone (e.g., 306-B), computer (e.g., 306-C), tablet (e.g., 306-D), monitor, digital video recorder, set-top box (e.g., 306-E), modem, router, media player, security system device, public branch exchange, point of sale device, and any combination thereof. In some cases, a content device 306 may also be a communication device 303, and vice versa. The communication devices 303 may transmit downstream information signals onto the communication links 304, and each of the various premises 305 may have a local communication device 303-D, such as an NID, that is used to receive and process those signals between content devices 306 and the other communication devices 303 (e.g., 303-A, 303-B, and 303-C).

An example of an adaptive energy system is described with respect to FIG. 3, as follows. When a user in a content delivery system 300 makes a request for content at a content device 306, the requested content can be received from a content source 301 by the distribution network 302, e.g., among received data. A device in the system 300, including, e.g., a communication device 303-D, content source 301, or a content device 306, determines metrics including quality data indicative of the quality of the content. The metrics can be transmitted to any device in the system 300. Some examples of metrics relating to quality of the content are provided in Table 2 below, which relate to things such as latency and errors in received content. For example, in some instances, the content may suffer from issues in the transmission or reception process, such as due to insufficient energy levels of, or lack of access to, certain communication devices 303. Such issues can cause content delivery problems at the content device 306 that may be unacceptable to a user. A quality threshold is a level of quality that can be established, and optionally that can be predetermined, that corresponds to content delivery at the content device 306 that is acceptable to a user. For example, a quality threshold may refer to a bit rate of greater than 5, 7.5, 8, or 12 Megabits per second (Mbps). As another example, a quality threshold may refer to a bit error rate (BER) of no more than $10^{-6}$, $10^{-9}$, $10^{-12}$, or $10^{-15}$. Yet another example of a quality threshold can include the synchronization of video and audio for simultaneous or near simultaneous output of both signals on a television or other display device within no more than 0, 10, 20, 30, or 40 milliseconds. Any number of measures of quality, including those identified in Table 2 below, can be applied to a quality threshold.

In some examples, an adaptive energy system can maintain a user's quality of experience by reallocating system resources to obtain the desired content. For example, a streaming video may experience glitches (e.g., resulting from lost packets, bit errors, or signal noise) on a display of a television, such as from a set-top box that may receive the video via a cable line. Upon detecting a reduction in quality of the video, the system could switch to another device to obtain the streaming video, such as from the Internet (e.g., via a wired or wireless modem) or from a cellular network (e.g., via a cell phone data connection). As another example, VOD content delivered via the Internet can become inaccessible or incur a reduction of quality due to noise or bandwidth reduction. Such issues could be caused by a device unrelated to the display of the VOD content, such as noise from a microwave or other electrical appliance, or from a bandwidth reduction caused by a large download initiated by a computer. Upon detecting such reduced quality of VOD content, the system could power down the interfering appliance or suspend the computer download while the VOD content is being displayed, and resume when the VOD content is finished being displayed. Any number of other devices in a system can also be controlled in a similar way based on the needs of a system for maintaining a user's experience with delivery of desired content. In these examples, when the metrics include quality data indicating quality of the received content at least at a quality threshold, then transmission of the content may continue undisturbed, or it may continue but with adjustments to the system that conserve energy while preserving quality of content delivery at least at the quality threshold. However, when the metrics include quality data indicating a quality of the received content is below the quality threshold, such as in the examples described above, then an adjustment to the transmission can be made.

Transmission adjustments in system 300 can be in the form of increasing energy usage of one or more communication devices 303 involved in the transmission. For example, an adjustment could include increasing a data transmission rate, increasing the power of one or more amplifiers, and/or increasing the number of ports activated in a communication device 303 in the signal path. Transmission adjustment can be in response to a determination that content is received for viewing at a user premise 305 at a bit rate that is too slow, with too many bit or packet errors, and/or with audio and video that can appear to be out of synchronization. Additionally or alternatively, an adjustment can be in the form of changing utilization of the communication devices 303, such as utilizing one or more different communication devices 303 for subsequent transmission of content to the content device 306, such as described above (e.g., using a modem connected to the Internet or a cell phone connected to a cellular network in place of an STB connected to a cable line, or vice versa). As another example, in response to determining that content is received for viewing at a user premise 305 having a quality that is trending or otherwise anticipated to become lower than a quality threshold, an adjustment can include allocating more or different content servers (e.g., at a central office 103) or communication paths (e.g., lines 101 or communication links 304) to deliver to a user premise 305 overall more content at a faster rate, and thereby, avoid a scenario where content is delivered below the quality threshold. Additional examples of adjustments to one or more devices include powering off, powering on, reducing power to, increasing power to, disabling functions of, enabling functions of, increasing current or voltage to, decreasing current or voltage to, bypassing, rerouting, engaging, switching, selecting one or more elements of a device, and any combination thereof, and doing so to avoid a scenario where content is not delivered at a premise at or above a quality threshold. In this way, a user experience with respect to content at a content device 306 can be maintained at an acceptable quality level while optimizing energy usage across the system 300.

In some examples, communication devices 303 and content devices 306 pass data between themselves to form a signal path that may support software interfaces for communications, including, e.g., for communications with external systems. As an example, the Society of Cable Telecommunications Engineers ("SCTE") has published a software interface specification called the Adaptive Power Systems Interface Specification ("APSIS") (e.g., ANSI/SCTE 216 2015) that provides a common set of such interfaces. APSIS is a data model that may be supported by any number of device-level protocols, such as Simple Network Management Protocol ("SNMP"). In at least some examples, one or more devices disclosed herein, such as communication devices 303 and/or content devices 306, can support APSIS, e.g., by supporting the APSIS semantics via a protocol binding, such as SNMP. As another example, OpenDaylight ("ODL") is an energy management open source project that may provide an open source controller for software defined networks. ODL can provide a framework for applications to view and manage devices, using any number of device-level interfaces. In at least some examples, one or more devices disclosed herein, such as communication devices 303 and/or content devices 306, can be visible to ODL by supporting an ODL compatible protocol, such as SNMP or OpenFlow. In at least some examples, communication devices 303 and/or content devices 306 can be visible to or compatible with one or more of APSIS, ODL, SNMP, OpenFlow, or other communications specifications, interfaces, or standards to measure and control energy usage in the manner described herein. Additionally or alternatively, any number of software defined networks ("SDN") or network functions virtualization ("NFV") can be used to measure and control energy usage in the manner described herein.

Communication devices 303 and/or content devices 306 may support High-Speed Data (e.g., Internet), digital voice, and digital video services of a cable co-axial access network, and these services may be interleaved into a single stream delivered to premises 305 at a CCAP device, such as at an NID. Communication devices 303 and/or content devices 306 can be made interoperable with any number of interfaces to emit energy usage metrics, service demand metrics, and QoS and QoE metrics, as well as accept energy controls, such as described below with respect to FIG. 4. As an example, APSIS can be used to measure and control devices within a cable plant or other system, such as in a CMTS/CCAP, RF amplifiers, nodes, or other devices. Additionally or alternatively, APSIS could be used for consumer equipment, such as in any of the content devices 306 disclosed herein. An application that monitors the energy usage and service demand metrics from the device may also monitor QoS metrics from the High-Speed Data, digital voice, and digital video platforms, as well as QoE metrics from communication devices 303 and/or content devices 306, such as IP video players on mobile devices (e.g., 306-B), web (e.g., 306-C), digital video recorders or set-top box devices (e.g., 306-E), security systems, public branch exchanges, or point of sale devices, in order to control service flows with a CCAP device, such as an NID. When service demand is relatively low, service flows many be relegated to a minimal set of ports with the CCAP device, and the unused ports set into low power states. The exact balance between active and inactive ports can be influenced by QoS and QoE metrics, including those provided in Table 2 below, to ensure that service flow pooling does not adversely affect service delivery.

Figure 4:
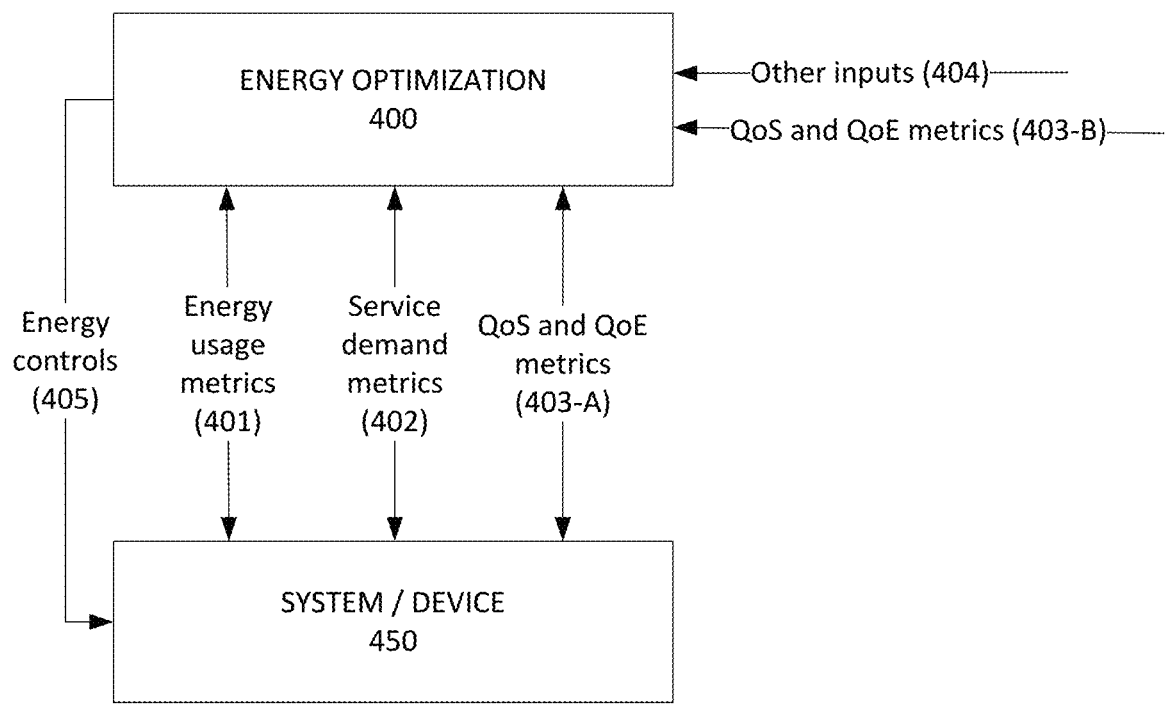
FIG. 4 shows a diagram of an adaptive energy system that can be implemented in connection with a system such as described herein.

FIG. 4 illustrates a diagram of an adaptive energy system that can be implemented in one or more devices 200 described herein, such as via processor 201. In some examples, an adaptive energy system corresponding to FIG. 4 can be implemented in connection with the content delivery systems 100 and 300, shown in FIGS. 1 and 3, respectively. As an example, by applying an adaptive energy system as illustrated in FIG. 4, the communication devices 303 within the content delivery system 300 can interoperate, along with applications deployed by service and/or content providers, to optimize energy usage. In at least some examples, an energy optimization component 400 in the adaptive energy system utilizes QoS and QoE metrics to maintain user experiences while optimizing system power usage at the system/device component 450. Components 400, 450 may comprise one or more computing devices. Energy optimization component 400 uses the QoS and QoE metrics 403 (e.g., shown as 403-A and 403-B and referred to herein both individually and collectively as 403) to determine whether adjustments must be made in relation to the energy levels and utilization of the communication devices (e.g., 303) in the delivery of services to content devices of a user (e.g., 306). By doing so, the energy optimization component 400 is able to maintain a desirable user experience and access to data at the content devices.

The system/device component 450 corresponds to a domain inhabited by devices (e.g., communication devices 303 and content devices 306) and/or systems of devices (e.g., system 100, system 300, and/or external systems (not shown)). The energy optimization component 400 corresponds to one or more energy optimization applications. The energy optimization component 400 may obtain real-time or near real-time measures of energy usage (e.g., energy usage metrics 401) and service delivery levels (e.g., service demand metrics 402) from the device/system component 450. In some examples, energy usage metrics 401 may relate to measurements of energy usage of a particular device (e.g., a communication device 303 or content device 306). Additionally or alternatively, energy usage metrics 501 may relate to measurements of energy usage of one or more devices in a particular data transmission path. Similarly, service demand metrics 402 may relate to measurements of demand or delivery for a service by a particular device (e.g., a communication device 303 or content device 306), by one or more devices in a particular data transmission path or group of devices, or by all devices within the system 300.

The energy optimization component 400 may also obtain QoS and QoE measures from one or more sources (e.g., QoS and QoE metrics 403-A from system/device component 450, and QoS and QoE metrics 403-B from an external source (not shown)), which may include measures from system/device component 450 or other systems. The three types of inputs, energy usage metrics 401, service demand metrics 402, and QoS and QoE metrics 403 (comprising 403-A and/or 403-B), as well as possibly other inputs 404, can be used to influence the behavior of devices represented by the system/device component 450, and therefore, influence system energy usage, via energy controls 405, to optimize energy usage while preserving a satisfactory user experience. These inputs, 401-404, can be time-bound and correlated into the same temporal region to produce real-time or near-real time, time-series data. Many useful energy optimization applications can be developed with the general framework of FIG. 4. For example, as the APSIS framework becomes more widely adopted by the cable industry, many applications scenarios may be identified that utilize energy usage and service demand metrics, along with QoS and QoE metrics, to optimize energy consumption while preserving the user experience.

The elements in FIG. 4, described above, may be implemented in software or hardware, either entirely or in part, within any of the content source 301, one or more communication devices 303, or content devices 306 shown in FIG. 3, as well as within any other device, such as those identified herein with respect to FIG. 1. For example, energy optimization component 400 may be included within one or more of the communication devices (e.g., 303); and system/device component 450 may be included within one or more of the content devices (e.g., 306) or local communication devices (e.g., 303-D). Additionally or alternatively, energy optimization component 400 could be included within one or more content devices (e.g., 306) or local communication devices (e.g., 303-D). In some examples, energy optimization component 400 could be external to, and in communication with, the content delivery systems 100 and 300, and the system/device component 450 could correspond to and be included within the content delivery systems 100 and 300.

As described herein, energy optimization component 400 monitors energy consumption via energy usage metrics 401. The energy usage metrics 401 can be obtained via software interfaces supported by communication devices (e.g., 303) within a service delivery signal path via a series of interconnected communication links (e.g., 304). Such interfaces may include APSIS-compatible interfaces. Energy usage metrics 401 may be expressed as Kilowatts per hour (Kw/h), where the total energy usage across a signal path for a given span of time is the sum of energy used by the communication devices 303 in the path. Service demand metrics 402 comprise a measure of the amount of data being delivered or requested in a period of time, which may be expressed as KiloBytes per hour (KB/h).

Figure 5A:
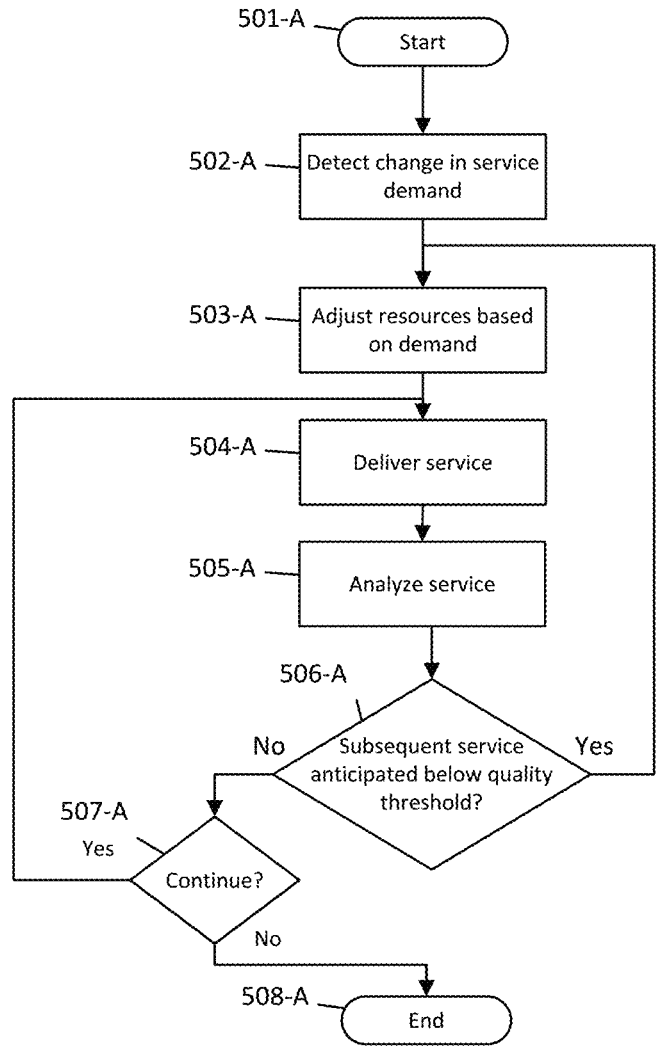
FIG. 5A shows a flowchart summarizing processes for an adaptive energy system such as described herein.
Figure 5B:
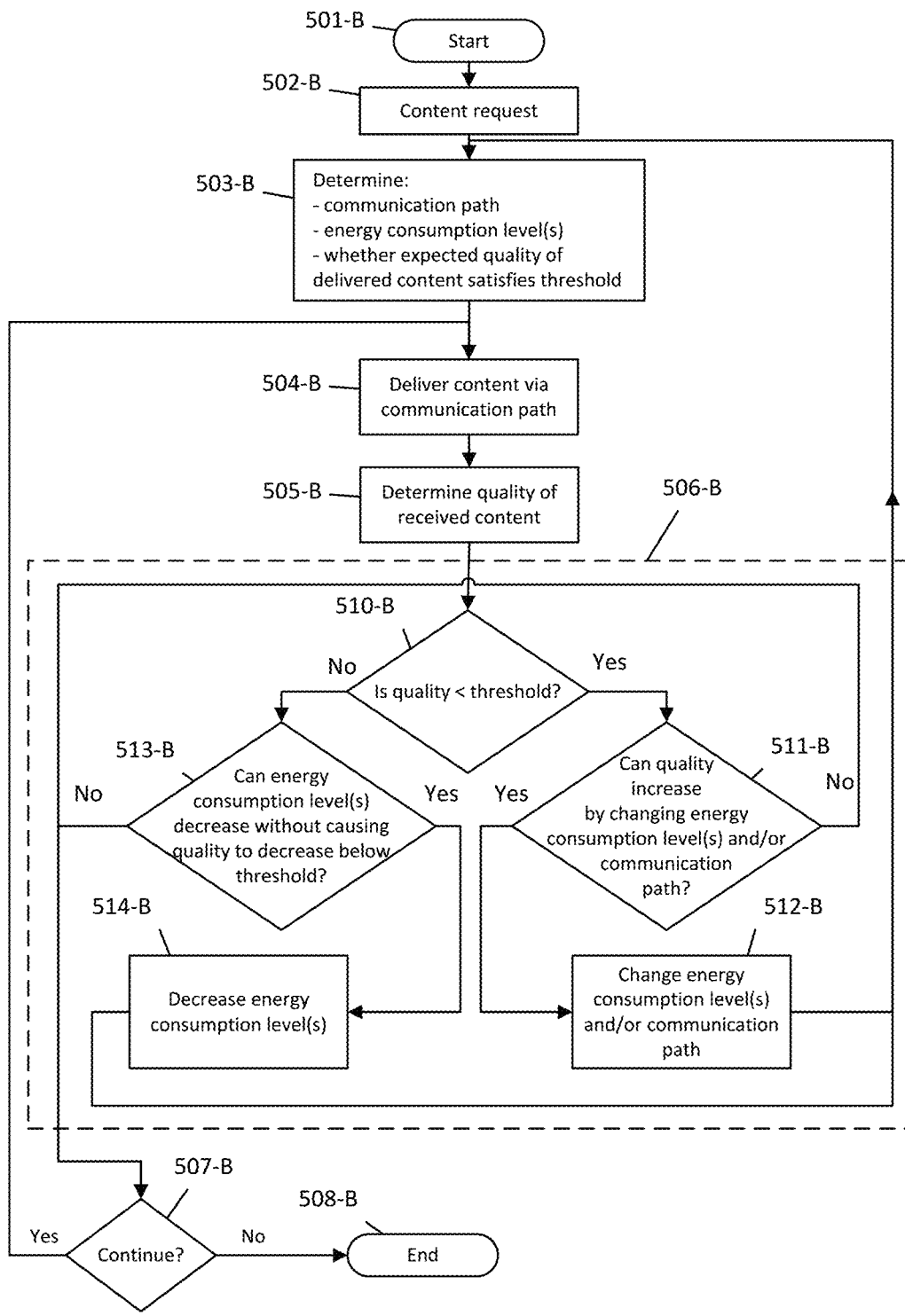
FIG. 5B shows a flowchart summarizing processes, in addition to or in the alternative of those in FIG. 5A, for a content delivery system implementing an adaptive energy system such as described herein.

FIGS. 5A and 5B are flowcharts summarizing processes for an adaptive energy system described herein. In some examples, these processes can be implemented in connection with a content delivery system such as systems 100 or 300 described above with respect to FIGS. 1 and 3, respectively. FIG. 5A summarizes processes for an adaptive energy system that can be applied to a variety of applications, such as those disclosed further herein, and FIG. 5B summarizes corresponding processes that can be more specifically applied to a content delivery system. Corresponding processes of FIGS. 5A and 5B are identified by the same numbered elements followed by an "A" or "B" for FIG. 5A or FIG. 5B, respectively.

At steps 501-A and 501-B, the processes may begin with a determination of a service request, step 502-A, or a service request in the form of a request for content, step 502-B. The request may be made by a content device (e.g., 306) or communication device (e.g., 303), to a content source (e.g., 301) or a communication device (e.g., 303), and may comprise a request for delivery of content or service, such as in step 502-B. The request may also be in the form of a determination of a change in service demand (e.g., due to an increase or decrease in user demand for content), such as in step 502-A. At steps 503-A and 503-B, a delivery determination is made, which may comprise a determination of a communication path for the requested service, including, e.g., adjusting resources based on the service demand, such as in step 503-A. The delivery determination may also comprise a determination of energy consumption levels for one or more communication devices (e.g., 303) in the determined communication path involved in the delivery of the service. With respect to a content delivery system, at step 503-B, the delivery determination can include a determination of a communication path for requested content as well as energy consumption levels for one or more devices in the communication path. In addition, at step 503-B, an expected quality of delivered content can be determined, including a determination of whether the expected quality of delivered content satisfies a threshold. At step 504-A and 504-B, the service is delivered at a device, which may include a content device or a communication device in the communication path receiving the content. In step 504-B, the requested content is delivered to one or more of a content device or a communication device. In some examples, content is received at a communication device (e.g., 303) in a network (e.g., 302), and thereafter, routed to additional communication devices in the network before ultimately reaching an NID (e.g., 303-D) or a content device (e.g., 306). At step 505-A, received service is analyzed and metrics, such as one or both of QoS or QoE metrics, can be generated that are indicative of a quality of the received service. At step 505-B, the received content is analyzed to determine a quality of the received content, which can include one or both of QoS or QoE.

At step 506-A and 506-B, it is determined whether an improvement in service delivery is possible, and more specifically, determined whether subsequent service is anticipated to be below a quality threshold. Alternatively, steps 506-A and 506-B can include determining one or more of whether subsequent service is anticipated to satisfy a quality threshold, whether subsequent service is anticipated to exceed a quality threshold, or whether subsequent service is anticipated to equal a quality threshold, in which case subsequent steps can be modified consistent with these alternative determining steps (e.g., switching "yes" and "no" paths for steps 506-A and 506-B). For example, based on prior service, the system can determine whether a quality is on a downward trend that, if the system is unchanged, could approach a quality that is below a quality threshold. If an improvement in service delivery is necessary and possible, then the system may return to step 503-A or 503-B, respectively, to determine delivery that further optimizes energy usage. For example, in a content delivery system, at step 510-B, it can be determined whether the quality of received content is below a threshold of acceptable quality. Alternatively, as above, step 510-B can include determining one or more of whether the quality of received content satisfies a quality threshold, whether the quality of received content exceeds a quality threshold, or whether the quality of received content is equal to quality threshold, in which case subsequent steps can be modified consistent with these alternative determining steps (e.g., switching "yes" and "no" paths for step 510-B). A quality threshold may refer to a bit rate of greater than 5, 7.5, 8, or 12 Megabits per second (Mbps). As another example, a quality threshold may refer to a bit error rate (BER) of no more than $10^{-6}$, $10^{-9}$, $10^{-12}$, or $10^{-15}$. Yet another example of a quality threshold can include the synchronization of video and audio for simultaneous or near simultaneous output of both signals on a television or other display device within no more than 0, 10, 20, 30, or 40 milliseconds. Any number of measures of quality, including those identified in Table 2 below, can be applied to a quality threshold. If received content is below the threshold or is approaching the threshold (or, alternatively, e.g., does not satisfy, does not exceed, or does not equal the threshold), then, at step 511-B, it can be further determined whether the subsequent content can be received having a greater quality, e.g., by one or both of changing (e.g., increasing or decreasing) an energy consumption level of one or more devices involved in the content delivery, or changing the communication path used for the content delivery (e.g., including or excluding one or more devices). If it is determined that a greater quality cannot be obtained in such a way, then at steps 507-A and 507-B it can be determined whether the process should end at steps 508-A and 508-B, respectively, or continue by returning to step 504-A and 504-B, respectively. If, however, it is determined that greater quality can be obtained, then one or more of an energy consumption level of one or more devices involved in the content delivery can be increased, or the communication path used for the content delivery can be changed, at step 512-B, after which the process can return to step 503-B. For example, it could be determined that greater quality can be obtained by using a different device or communication path (e.g., a modem connected to the Internet, or a cell phone connected to a cell network, to deliver content in place of an STB connected to a cable line), increasing the power of one or more amplifiers, increasing the number of ports activated in a communication device in the communication path, and/or using more servers as additional sources of content. A determination that greater quality can be obtained could be in response to content being received for viewing at a user premise at a bit rate that is too slow, with too many bit or packet errors, and/or with audio and video that can appear to be out of synchronization.

By increasing power and/or utilizing more ports or devices, the system could deliver service that satisfies, or remains at or above, a quality threshold. Additionally or alternatively, the communication path used for the content delivery can be in the form of changing utilization of the communication devices 303, such as utilizing one or more different communication devices 303 for subsequent transmission of content to the content device 306. For example, an initial communication path could include transmissions from communication device 303-C, to communication device 303-A, to communication device 303-B, to communication device 303-D, as shown in FIG. 3. However, it may be determined that for a period of time signals passing through communication device 303-B experience too many errors, leading to service delivery at a user premise 305 that is below or approaching a level below a quality threshold. In response to determining that content is received for viewing at a user premise having a quality that is already, or is trending to becoming, lower than a quality threshold, an adjustment of the above signal path can include changing the communication path to exclude communication device 303-B, and instead communicate from communication device 303-A directly to communication device 303-D, which could result in delivering to a user premise 305 overall more content at a faster rate, and thereby, avoid a scenario where content is delivered below the quality threshold.

If, at step 510-B, it is determined that received content is not below the threshold (or, e.g., alternatively, that the quality of received content satisfies, exceeds, or equals the threshold), then, at step 513-B, it can be further determined whether decreasing an energy consumption level of one or more devices involved in the delivery of content to conserve energy will cause subsequent content received having a quality below the threshold. For example, unused or unnecessary communication devices 303 in the system could be turned off, or enter a sleep mode or other reduced power mode, if it is determined that doing so could conserve overall system energy without resulting in service delivery below a quality threshold. If such a decrease would not result in quality below the threshold, then, at step 514-B, an energy consumption level of one or more devices can be decreased accordingly, such as utilizing an additional server, increasing power in an amplifier, using additional ports on a communication device currently in use, and/or activating an additional communication device 303, as determined during a repeating of step 503-B. If, however, such a decrease cannot be obtained without resulting in quality below the threshold, then the process can return to step 507-B without decreasing an energy consumption level. Finally, at steps 507-A and 507-B, it can be determined whether the process should continue. If so, the process can return to steps 504-A and 504-B, respectively, and if not, the process can end at steps 508-A and 508-B, respectively.

In some examples, an adaptive energy system can optimize energy usage just by adjusting the power of one or more devices. In other examples, an adaptive energy system can optimize energy usage just by determining a different communication path or selecting one or more different communication devices for inclusion or exclusion in service delivery. In some examples, QoS, QoE, or both, may be improved by modifying the communication path for the delivery of content, such as by including or excluding one or more communication devices. For example, system 300 in FIG. 3 can optimize energy usage by using a secondary backbone if a primary backbone is located in a different region that experiences higher energy costs and its utilization in the delivery of services to a user premise 305 becomes less efficient than the secondary backbone. Similarly, if a first fiber ring experiences conditions that lead to bit errors (e.g., a bit error rate (BER) of more than $10^{-6}$, $10^{-9}$, $10^{-12}$, or $10^{-15}$), lost packets (e.g., more than 1 per 100, 1,000, or 10,000), or other transmission problems causing reduced video and/or audio quality at a user premise 305 (e.g., such as identified in Table 2 below), a second fiber ring that can be coupled to a different router can be utilized in its place. In yet another example, an existing communication path using a first optical node coupled to a first amplifier can be modified to use a second optical node coupled to a second amplifier, if either or both of the first optical node and the first amplifier experiences a surge in usage that would result in reduced efficiency compared with using the second optical node and/or the second amplifier in the communication path. Any number of additions, subtractions, or changes of devices in a communication path, including but not limited to each of the devices identified herein with respect to FIGS. 1 and 3, can be implemented to optimize energy usage across a system such as systems 100 and 300, respectively.

Additionally or alternatively, QoS, QoE, or both may be improved by increasing energy consumption of one or more devices in the communication path service delivery. Improvements can also include decreasing energy consumption while maintaining QoS and QoE above acceptable thresholds. For example, system 300 in FIG. 3 can improve QoS and/or QoE by utilizing a higher energy secondary backbone if a lower energy primary backbone experiences latency issues and its utilization in the delivery of services to a user premise 305 leads to synchronization delays between video and audio (e.g., greater than 0, 10, 20, 30, or 40 milliseconds) that could otherwise be avoided by using the secondary backbone. Similarly, if a first fiber ring experiences conditions that lead to bit errors (e.g., a BER of more than $10^{-6}$, $10^{-9}$, $10^{-12}$, or $10^{-15}$), lost packets (e.g., more than 1 per 100, 1,000, or 10,000), or other transmission problems causing reduced video and/or audio quality at a user premise 305 (e.g., such as identified in Table 2 below), energy usage within the fiber ring could be increased, such as by using more ports or devices, in order to improve QoS and/or QoE at a user premise 305. In yet another example, an existing communication path using an amplifier can be modified by allocating power to fewer ports in the amplifier, e.g., reducing the utilization of 8 ports down to 4, 2, or 1 port(s) resulting in an increased output signal per port. Any number of additions, subtractions, or changes of devices in a communication path, including but not limited to each of the devices identified herein with respect to FIGS. 1 and 3, can be implemented to increase energy usage in order to provide improved service delivery at a user premise (e.g., 102 and 305) in any system, such as systems 100 and 300. If it is determined that an improvement is not possible, then the system may return to step 504-A or 504-B and continue service delivery as previously determined.

In some examples, if the QoS and QoE metrics indicate an acceptable quality of the received service, such as video is accessible by a user (e.g., acceptable QoS) and successfully delivered for viewing at a user location without noticeable delay and without noticeable errors (e.g., acceptable QoE), then the system may either maintain energy consumption levels for the communication devices involved in the transmission of the content (e.g., if it is determined that an improvement in either QoS or QoE is not possible), or further optimize the communication path involved in the transmission of the content. In some examples, maintaining energy consumption levels may include one or both of maintaining the communication path used for the content delivery, or maintaining the power levels of each device in the data communication path involved in the content delivery. Optimizing the communication path may include one or both of altering the communication path to use fewer, more, or different devices, or decreasing an energy consumption level of one or more communication devices involved in the transmission of the content. For example, optimizing the communication path may include using more servers, using fewer ports in an amplifier, or using a secondary backbone in place of a primary backbone. Any number of additions, subtractions, or changes of devices in a communication path, including but not limited to each of the devices described with respect to FIGS. 1 and 3, can be implemented to optimize the communication path. One or more intermediate thresholds can also be established such that when a quality of received content is within an intermediate threshold above an acceptable quality, optimizing the communication path may include minor power reductions for one or more communication devices involved in the transmission of the content or minor adjustments of the communication path. For example, a minor adjustment could include changing an amplifier to use 4, 2, or 1 port(s) instead of 8 ports. Additionally or alternatively, when a quality of received content is above an intermediate threshold above an acceptable quality, optimizing the communication path may include more aggressive power reductions for one or more communication devices involved in the transmission of the content, or more significant altering of the communication path. Any number of such intermediate thresholds may be established to optimize energy usage while maintaining acceptable QoS and QoE. Intermediate thresholds may also correspond to specific values, ranges of values, or variables according to one or more equations.

If the QoS or QoE metrics indicate that the quality of the received service is unacceptable, and that an improvement in either or both is possible, then, in some examples, the system may return to step 503-A or 503-B to re-determine delivery so that the quality of received content can be improved to an acceptable level, such as by reallocating resources or energy usage. As an example, an unacceptable quality of received service may correspond to a video requested by a user being unavailable due to a lack of system resource utilization necessary to deliver it to the user (e.g., unacceptable QoS) or a video requested by a user being delivered at a user location but with noticeable delay or with noticeable errors (e.g., unacceptable QoE). If an unacceptable quality of received content can be improved with increased energy or resource usage, then, at step 503-A or 503-B, the system may increase an energy consumption level at one or more communication devices involved in the transmission of the content. Additionally or alternatively, at step 503-A or 503-B, the system may reallocate resources such as by determining a signal path for providing higher quality content reception. One or more intermediate thresholds can also be established such that when a quality of received content is within an intermediate threshold below an acceptable quality, increasing energy consumption may include minor power increases for one or more communication devices involved in the transmission of the content or minor adjustments of the communication path. For example, increasing quality of received content from the intermediate threshold below an acceptable quality to above a quality threshold could be achieved by activating a second amplifier for a second communication path and changing a first amplifier to use one port for a first communication instead of two ports for respective first and second communication paths. As another example, an intermediate threshold could be a determination that High Definition video at 720p is received without errors but HD video at 1080p is received with periodic errors (e.g., more than one instance of freeze frame per 1, 10, or 100 minute(s)). Upon such a determination, a bit rate can be increased from greater than 5 or 7.5 Mbps to greater than 8 or 12 Mbps to deliver HD video at 1080p without errors. Additionally or alternatively, when a quality of received content is below an intermediate threshold below an acceptable quality, increasing energy consumption may include more aggressive power increases for one or more communication devices involved in the transmission of the content, or more significant altering of the communication path such as described above. Any number of intermediate thresholds may be established to optimize energy usage while maintaining acceptable QoS and QoE.

Following the above steps, the system may repeat by continuing to analyze received service and further optimize energy consumption in the manner described above. Upon a determination that further service analysis is not required, e.g., if a content device terminates a request for content, the processes may end.

Figure 6:
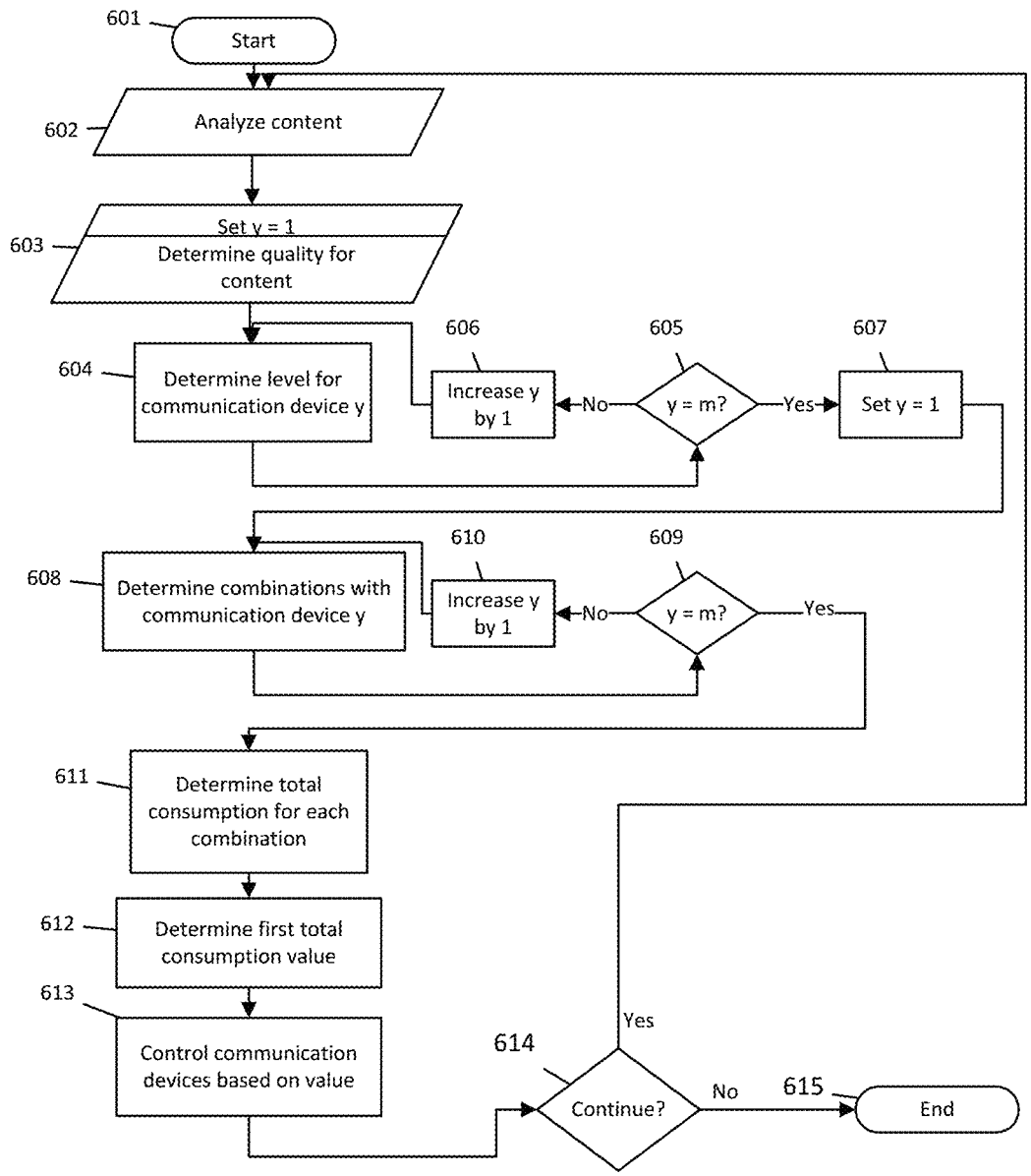
FIG. 6 shows a flowchart summarizing processes, in addition to or in the alternative of those in FIGS. 5A and 5B, for an adaptive energy system such as described herein.

FIG. 6 is a flowchart summarizing processes, alternative to or in addition to those described above in FIGS. 5A and 5B, for an adaptive energy system in which a quality and an energy consumption level for each of a plurality of communication devices can be determined and used to control transmissions. In some examples, the processes of FIG. 6 can be implemented in connection with a content delivery system such as described herein. According to the processes of FIG. 6, any number of communication devices (e.g., 303 in FIG. 3) in a communication path involved in delivery of content to a content device (e.g., 305 in FIG. 3) can determine acceptable energy consumption levels for the respective communication device that maintains the quality of content received by the respective communication device at least at a quality threshold. These acceptable energy consumption levels for each communication device can then be analyzed to determine one or more combinations of communication devices and their respective energy consumption levels for delivering content to a content device at least at the quality threshold. These combinations can then be analyzed to determine an optimal combination of communication devices and their respective energy levels for delivering content to a content device while maintaining quality of content received by the content device that satisfies a quality threshold.

At step 601, the process may begin after an initial transmission of content from a content source (e.g., 301). At step 602, the content or service is received and analyzed at a communication device (e.g., 303). A wide variety of analyses can be performed, each of which can inform the system whether received content satisfies a threshold such that a user's experience of viewing and/or listening to content (e.g., streaming video, VOD content, music, television programs, or movies) remains satisfactory. For example, received content such as movies and television programs can be analyzed to identify information about bitrate (e.g., average bitrate, bitrate change, bitrate increase, bitrate decrease, bitrate usage distribution, highest bitrate, highest bitrate duration), latency or delay (e.g., average latency, startup latency, trick play latency, trick play speed latency, fast forward trick play latency, rewind trick play latency), buffering or rebuffering (e.g., rebuffering events, rebuffering time, rebuffering ratio, time between rebuffering events), bandwidth (e.g., average bandwidth per time period, average bandwidth change), channel uptime, switch over time, failure (e.g., failure events, failed fragments, transcoder failure, mean time between failure, recording failure mean time to resolution, outage mean time to resolution), resource utilization (e.g., memory or power usage of one or more devices used to deliver the content), errors (e.g., number of errors, mean time between errors, fatal errors, time to relief, playback attempts), viewing (e.g., viewing time, user engagement level), channel security, service success rate, video characteristics (e.g., image entropy, pixelation, color distortion, blurriness, jitter), audio characteristics (lip sync, audio loudness, ringing), and any other measureable characteristic of the content. These and other characteristics are described further below with respect to Table 2.

After analyzing the received content, such as movies and television programs, the content may be routed to additional communication devices in the network before ultimately reaching a final communication device 303, such as an NID (e.g., 303-D), or a content device (e.g., 306). During or following the routing of content or a service in the network, or, during or after consumption of the content or service at a user device, an operation is performed whereby received content is analyzed and QoS and QoE metrics are generated that are indicative of a quality of the content as received. Non-exhaustive examples of QoS and QoE metrics are described below with respect to Table 2. As an example, a QoS metric can be a measure of latency or delay between when a viewer indicates a selection of a Video On-Demand (VOD program) for viewing and the time it takes for the program to start presenting on the user's television. For example, a QoS metric for latency that is less than one or two seconds may be satisfactory and satisfy a quality threshold, whereas latency above that time may be unacceptable and require an adjustment of the content delivery. As another example, a QoE metric can be a measure of instances of freeze frame, where a user experiences a momentary freeze of a television program on the user's television. A QoE metric for freeze frame that is less than one instance per 1, 10, or 100 minutes could be acceptable and satisfy a quality threshold, whereas freeze frame occurrences at a greater frequency may be unacceptable and require an adjustment of the content delivery. Additional examples of QoS and QoE metrics are described below with respect to Table 2.

Indications of the QoS and QoE metrics can be determined at or transmitted from a communication device (e.g., 303) such as a set-top box, or a content device (e.g., 306) such as a television, and at step 603 a quality of the content is determined. For example, a set-top box can analyze a VOD program received for display on a user's television and, based on that analysis, determine a quality of the content according to one or more QoS and/or QoE metrics. Additionally or alternatively, an upstream device, such as in an access network, transport network, backbone network, or backoffice network could receive or determine QoS and/or QoE metrics based on system data or any information received in the system 300 to determine a quality of the content. Before proceeding to the next step, a variable "y" can be set to 1, where "y" refers to a specific communication device out of a total number, "m," of communication devices in the network that are selected to be controlled in accordance with an adaptive energy system disclosed herein. For example, "m" could be a number of servers used to deliver a VOD program, a number of routers used in a backbone network, a number of ports used in an amplifier to deliver the VOD program, or any other number of devices or portions of devices used for delivering the VOD program to a user premise 305. At step 604, for a first communication device (or communication device "y", where "y" equals 1), one or more acceptable energy consumption levels are determined that maintain the quality of the content at least at a quality threshold, where the quality of content may be measured by QoS and QoE metrics. For example, one acceptable energy consumption level may include a first portion of the communication device such as an amplifier (e.g., ports 1 to 4, each operating ¼ of the total power of the amplifier) while a second portion (e.g., ports 5 to 8) is powered off. A second acceptable energy consumption level may include both first and second portions (e.g., all of ports 1 to 8) of the amplifier operating each at reduced power (e.g., each at ⅛ of the total power of the amplifier). Other acceptable energy consumption levels can include any other combination of portions of devices powered on or powered off. These processes can be repeated for each of the m-number of communication devices referenced above, where step 605 determines whether y equals m, and if not, y is increased by 1 at step 606.

Steps 604-606 can be repeated until step 604 has been performed for the last of the m-number of communication devices. Alternatively, steps 604-606 can be performed for any number of communication devices greater or less than the m-number of communication devices by changing the value of "m" in step 605 accordingly. Next, y is reset to 1 at step 607. At step 608, for a first communication device (or communication device "y", where "y" equals 1), one or more combinations of acceptable energy consumption levels are determined that comprise an acceptable energy consumption level for each of the m-number of communication devices (e.g., 303-A, 303-B, 303-C and 303-D). That is, after acceptable energy consumption levels have been determined for each of the m-number of communication devices individually from step 604, the system can further identify which acceptable energy consumption levels can be satisfied when communication device y operates with other of the m-number of communication devices. In this way, a table (such as Table 1 below) or other indication can be determined that identifies allocations of resources across the m-number of communication devices that will maintain the quality of content received at least at a quality threshold. Step 608 can be repeated for at least each of the m-number of communication devices referenced above, and could be repeated further as the system gathers more information. Step 609 determines whether y equals m, and if not, y is increased by 1 at step 610. Thereafter, steps 608-610 are repeated until step 608 has been performed for the last of the m-number of communication devices. Alternatively, steps 608-610 can be performed for any number of communication devices greater or less than the m-number of communication devices by changing the value of "m" in step 609 accordingly. Thereafter, at step 611, for each combination, a total energy consumption value is determined that corresponds to the combined energy consumptions of the m-number of communication devices for a period of time. Next, at step 612, a first total energy consumption value is determined. The first total energy consumption value could be, as an example, the lowest total energy consumption value determined from step 611. Then, at step 613, the communication devices are controlled to operate based on a combination of acceptable energy consumption levels corresponding to the first total energy consumption value. Finally, at step 614, it can be determined whether the process should continue. If so, the process can return to step 602, and if not, the process can end at step 615. The process described above with respect to FIG. 6 can optionally be simplified, e.g., by reducing the value of "m," removing steps 608-610, and/or removing one or more of steps 611-613.

Table 1 below can be generated by the above steps, such as described with respect to FIG. 6. Additionally or alternatively, Table 1 can be generated based on known characteristics of the communication devices:

TABLE 1

| Total Energy Consumed | Device 2 (ON) | Device 2 (OFF) |
| --- | --- | --- |
| Device 1 (ON) | 10 Watts (5 Watts each device) | 8 Watts |
| Device 1 (OFF) | 7 Watts | 0 Watts (no service) |

Table 1 above depicts various configurations of communication devices that can be used for delivering service, and respective energy consumption levels of each configuration. In Table 1, requested service can be delivered using a combination of both "device 1" and "device 2" at a total energy consumption level of 10 Watts, with each using 5 Watts. For example, "device 1" could be a communication device 303-A and "device 2" could be a communication device 303-B, shown in FIG. 3, either or both of which can be used to deliver a requested service from a source 301 (e.g., via communication device 303-C) to a user premise 305 (e.g., via communication device 303-D). As examples, the requested service could include VOD programs, Internet service, or television programs, and one or more communication paths among communication devices 303 in the network 302 can be enabled (or disabled) to efficiently deliver the requested service. Instead of utilizing both "device 1" and "device 2," service can be delivered using "device 1" exclusively (i.e., with "device 2" turned off) at a total energy consumption level of 8 Watts, or using "device 2" exclusively (i.e., with "device 1" turned off) at a total energy consumption level of 7 Watts. If both "device 1" and "device 2" are turned off, then the requested service cannot be delivered, and thus, this configuration fails to maintain the quality of content received at least at a quality threshold. Based on the results in Table 1, while three of the four above results may be acceptable energy consumption levels for each of "device 1" and "device 2," the combination of "device 2" on and "device 1" off yields the lowest total energy consumption value of 7 Watts. Accordingly, the processes described above regarding FIG. 6 would operate using the combination of "device 2" on and "device 1" off due to it producing the lowest total energy consumption value. The above example can be expanded to determine a communication path that delivers a requested service using the lowest total energy consumption across the system.

In some examples, Table 1 can be expanded, and the processes described above regarding FIG. 6 can be repeated, for any number of communication devices 303 and/or any number of content devices 306. Additionally or alternatively, the processes described above can be performed for future content delivery, e.g., before content is received by a communication device or content device, based on prior analyses or operational data relating to the communication devices. In some examples, certain requested content may have different known acceptable quality levels that correspondingly may require different overall energy consumption for delivery. For example, a High Definition ("HD") video may require a greater acceptable quality level than the same movie in Standard Definition ("SD"), which may require a greater acceptable quality level than an audio recording of the video. Similarly, an HD video may require greater overall energy consumption for delivery than the same video in SD, and video may require greater overall energy consumption for delivery than audio. Different characteristics of content, such as genre, source, format, or media type, can also have different acceptable quality levels and associated energy consumption for delivery.

Figure 7:
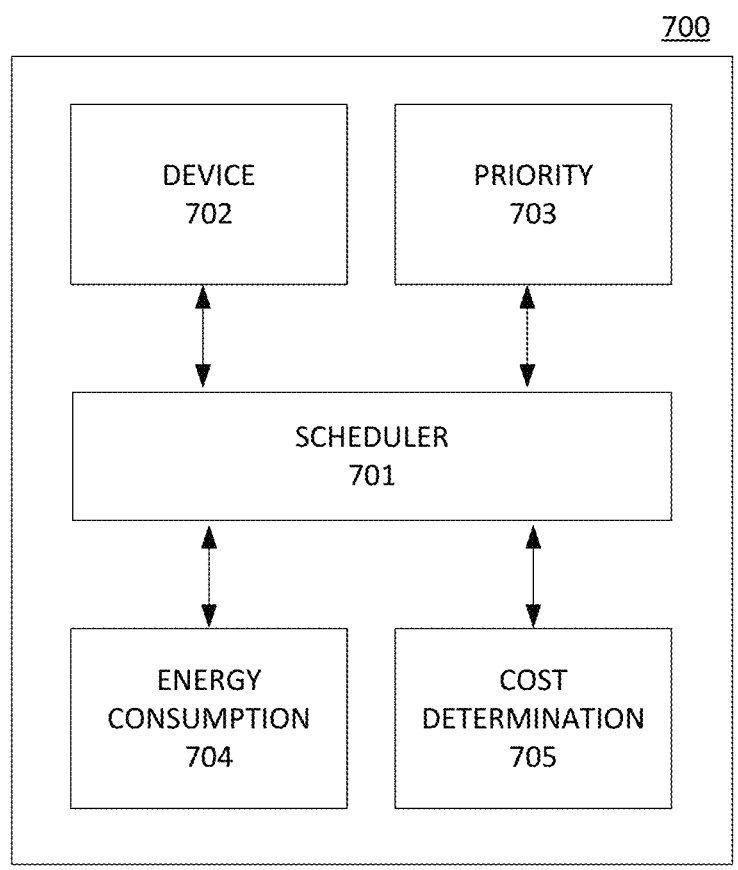
FIG. 7 shows a diagram for energy optimization in an adaptive energy system such as described herein.

FIG. 7 illustrates a diagram of an example for energy optimization of an adaptive energy system disclosed herein that can be implemented in one or more devices 200 described above, such as via processor 201. Energy optimization component 700 may be implemented in a system that also implements energy optimization 400 of FIG. 4. Additionally or alternatively, energy optimization component 700 may be utilized in the processes described above, e.g., by performing step 503-A of FIG. 5A and/or step 503-B of FIG. 5B, for determining delivery of a service request. Energy optimization component 700, and any of elements 701-705 discussed further below, may be implemented in hardware or software, or any combination thereof, and may be included at any location in a system (e.g., systems 100 or 300 in FIGS. 1 and 3, respectively, or system 800 in FIG. 8 discussed below) for optimizing resource and energy usage of one or more devices in the system. As an example, scheduler 701 may comprise a processor configured to communicate with elements 702-705, which may each further comprise one or more processors, memories, software or other hardware implementation, or any combination thereof. In some examples, scheduler 701 may comprise a controller in a software-defined network ("SDN") environment.

In some examples, scheduler 701 may respond to a request for service, such as a request for a VOD program, Internet service, or a television program, by determining delivery for the requested service. For example, scheduler 701 can determine a communication path, including identification of each device involved in the delivery of a requested VOD program, by communicating with device component 702. Device component 702 can include information regarding each device in the network that can be involved in the delivery of requested VOD program, including any of the devices in FIGS. 1, 3, and 8. This information regarding each device can include identification, operational capabilities, energy consumption, location, availability, and any other details about a device in the network. Scheduler 701 may also communicate with a priority component 703 that can provide information for prioritizing service requests, such as service demand (e.g., prioritizing high demand real-time video streaming programs over low demand overnight device software downloads), device usage or system bandwidth (e.g., prioritizing critical over non-critical operations during periods of high usage of a device or low system bandwidth), user service level (e.g., service requests from premium accounts may receive higher priority than non-premium accounts), service request categories (e.g., requests for real-time content such as live video streams may have higher priority than requests for pre-recorded video programs), or any other information relevant to prioritizing service requests. Priority component 703 can also include present, past, or predicted information for prioritizing service requests, such as VOD program requests. Scheduler 701 may also communicate with an energy consumption component 704 that can provide information about energy consumption of a device or group of devices in the system, or across the entire system. For example, energy consumption information can include how much energy one or more devices may consume during an operation, as well as operational characteristics of a device, such as the extent to which a device can operate at lower or higher energy consumption levels and the relative performance of the device at each energy consumption level. Scheduler 701 may also communicate with a cost determination component 705 regarding costs associated with various options for service delivery. For example, cost determination component 705 can include information such as present, past, or predicted energy costs that may be associated with service delivery. Cost determination component 705 can also include information such as relative costs for the inclusion or exclusion of one or more devices in a system. Scheduler 701 can analyze any or all information received from device component 702, priority component 703, energy consumption component 704, or cost determination component 705 to determine delivery of a requested service. In some examples, energy optimization component 700 can provide a service operator 'keep-alive' service, in which certain services can be degraded in order to maintain one or more minimal, but active, bi-directional communications links, such as in the event of a grid power loss or other service disruption.

In some examples, energy optimization component 700 can be implemented to provide energy optimization at a local premise (e.g., 305 in FIG. 3). For example, a user could control a plurality of local devices (e.g., 306) using scheduler 701 to optimize local energy usage. Cost determination component 705 could be configured to include a user energy budget, which can inform scheduler 701 in making determinations for using local devices (e.g., included in device component 702), and their associated energy consumption (e.g., included energy consumption component 704). As an example, if scheduler 701 determines that a current use of a local device such as a television (e.g., 306-A) exceeds the user's energy budget, or approaches it within a threshold value, the scheduler 701 can reduce power consumption of another local device, such as a computer (e.g., 306-C), by a proportional amount of energy during a period of time. Local devices under control of scheduler 701 can also include devices other than content devices 306, such as furnaces and air conditioners in HVAC systems, washers, dryers, hot water heaters, dishwashers, stoves, gas or electric fireplaces, microwaves, refrigerators, freezers, and any other local device that may consume a significant amount of energy. Energy consumption that can be measured by an adaptive energy system as disclosed herein can include any one or more sources of energy, such as electrical (including, e.g., sourced from an electrical grid, batteries, solar power, or wind power) and gas, and can include costs associated with each (e.g., from cost determination component 705 and energy consumption component 704).

For example, scheduler 701 could present a user with an option of adjusting the air conditioner by three degrees to watch a movie in HD instead of SD, or reducing Internet download speed to operate a dishwasher, in order to avoid exceeding a user's energy budget. As other examples, a user could schedule a digital video recorder (DVR) to record a television program at a specified time or request to download and install a program update for a laptop or other equipment, and scheduler 701 can respond by scheduling to change energy usage of one or more other devices, such as a furnace, at the same time to maintain a total energy usage at or below a certain level. In another example, scheduler 701 can determine where a user is located within a premise based on the user's activity involving one or more devices (e.g., a request to watch a VOD program on a television located in a living room could indicate the user is likely present in that room during the display of the VOD program) and based on the location, adjust energy usage of one more devices such as a furnace and an air conditioner in an HVAC system during that activity (e.g., control the HVAC system to increase or decrease temperature in the living room at the time of the VOD program viewing during cold or warm weather, respectively). In yet another example, scheduler 701 can detect when a user requests to record a television program on a DVR and determine whether the same program would be available at another time (e.g., retransmitted at 3 am) during which system resources are consuming less energy (e.g., air conditioning or a furnace may be set at a lower level). Scheduler 701 could automatically, or present the user with an option to, record the television program on the DVR at the later time to conserve energy and/or maintain a total energy usage at or below a certain level.

Scheduler 701 could also detect usage of interfering devices, and adjust usage of other devices to minimize interference. For example, activating a microwave or other electrical appliance could create signal interference for a television signal, and scheduler 701 could detect when a microwave is activated and adjust devices (e.g., increase power of an amplifier or increase a signal bit rate in anticipation of greater noise). As another example, activating an overnight video security monitor could interfere with a wireless Internet signal, and upon detection of such interference, scheduler 701 could schedule Internet downloads (e.g., program updates) during periods of time when the security monitor may not be activated (e.g., at first daylight). Scheduler 701 can be used to detect interference from any other devices, and adjust operations devices to minimize the impact of interference. Any number of other combinations of adjusting or reducing energy usage by one or more first set of devices in connection with adjusting or increasing energy usage by one or more second set of devices can be implemented by scheduler 701 to provide energy optimization.

In some examples, energy optimization 700 can include a standalone device or can be incorporated in another user device (e.g., a set-top box, DVR, television, or remote control). An energy optimization 700 device can include a user interface to schedule use of devices, e.g., televisions, computers, modems, set-top boxed, DVRs, furnaces and air conditioners in HVAC systems, washers, dryers, hot water heaters, dishwashers, stoves, gas or electric fireplaces, microwaves, refrigerators, freezers, and any other local device that may consume a significant amount of energy.

In some examples, energy optimization 700 can interface with a power company to coordinate energy optimization. For example, cost determination component 705 can receive cost information from the power company, and energy consumption component 704 can provide energy consumption information to the power company. The power company could also communicate with scheduler 701 to assist in the determination of energy usage and costs, and provide recommendations to the user for scheduling devices to operate in a coordinated and energy efficient manner, such as scheduling requested services (e.g., VOD programs, DVR recording, and Internet downloads) during times of low energy usage and/or cost (e.g., overnight).

Any or all of above processes described with respect to FIGS. 5A, 5B, 6, and 7 may be performed for an entire network (e.g., 302 in FIG. 3 or 802 in FIG. 8), for a subset of communication devices and content devices in a network, or for a particular communication device or content device. In addition, any or all of the above processes may be performed by any device, and at any location, in a content delivery system such as systems 100 and 300. Various mechanisms can be used to measure service demand on a specific communication device or content device, or set of communication devices or content devices, on a signal path. By adjusting an energy consumption level of one or more devices in the manner described above, a network can maintain the quality of content received at a content device at least at a predetermined threshold. As a result, energy consumption across the system can be minimized while maintaining the availability and quality of services at the user premises.

An adaptive energy system as disclosed herein can be applied to a variety of applications. In addition to those described above, the following are exemplary applications that can benefit from an adaptive energy system. These applications can be included within systems such as 100 and 300 in FIGS. 1 and 3, respectively, or within devices or systems external from and in communication with systems such as 100 and 300. Alternatively, these applications can be included in a system other than systems 100 and 300. The following applications also can also include any of the processes described above with respect to FIGS. 5A, 5B, 6, and 7.

Power Reduction:

In some examples, an adaptive energy system can be implemented in a geographical area, such as nationwide or globally, in a manner that conserves resources through selective power reduction. For example, in a cable or other content delivery system, service demand and consumption often ebbs and flows within a geographical area, typically rising dramatically in prime-time evening hours and falling significantly in the early morning hours when most users are asleep. During the day, a lower steady state demand may occur, and at peak time, such as dinner time and after dinner time in a local area, demand typically ramps up dramatically. When a network architecture is designed, it may account for the peak demand times by having sufficient resources in place to accommodate peak service demands. However, an adaptive energy system can power down portions of the network in off peak demand times and still maintain a desired quality of service.

Power reduction disclosed herein can be implemented in a manner described above regarding the energy optimization component 700 of FIG. 7 and the processes of FIG. 5A. Energy optimization component 700 can be included in processor 201 described above regarding FIG. 2. As an example, in a given load distribution system comprising energy optimization component 700, a load may be distributed that might come in (e.g., by service requests at step 502-A of FIG. 5A) at peak time (e.g., identified by priority component 702) to a plurality of different servers (e.g., identified by device component 702). An adaptive energy system can utilize scheduler 701 (e.g., at step 503-A of the processes in FIG. 5A), to periodically power down certain portion of those servers (e.g., based on information from energy consumption component 704) as they transition to off peak during service delivery (e.g., at step 504-A of FIG. 5A). Alternatively or additionally, scheduler 701 could use information from device component 702 and energy consumption component 704 (e.g., at step 505-A of FIG. 5A) to analyze service and to reduce operations (e.g., at step 503-A, after determining that an improvement is possible at step 506-A) down to one server or in certain instances, possibly power off all servers, e.g., if no demand is experienced at a certain node in the system (e.g., based on information from priority component 702). For example, a secondary server for VOD programs could be powered down during off-peak hours when a primary server can sufficiently address system wide demands for the VOD programs during that time.

In some examples, energy optimization component 700 can be implemented in a system, such as system 300 of FIG. 3, to power down one or more communication devices (e.g., 303), such as an optical node during off-peak hours. For example, when communication devices 303A, 303-B, 303-C and 303-D (which can be optical nodes) are each experiencing low demand, energy optimization component 700 could power down communication device 303-B without disrupting service at a user premise 305 (e.g., without negatively impacting video streaming or Internet downloads), which could continue to receive service via communications from 303-C to 303-A to 303-D. When communication device 303-D experiences minimal or no demand (e.g., between 2 to 4 am), energy optimization component 700 could power down communication device 303-D, and possibly also reduce power or power down one or more of communication devices 303-A, 303-B, or 303-C. In effect, in some examples, an adaptive energy system can use energy optimization component 700 in system 300 to operate as a load balancer to evenly distribute traffic to a set number of resources (e.g., communication devices 303). An adaptive energy system in this way can minimize the number of resources that are made available so that a content delivery system does not just keep everything turned on all the time, but only to the extent that such reductions in operations do not disrupt the user experience. A system should be aware of and measure the user experience to ensure it is maintained.

Repurposing Resources:

In some examples, an adaptive energy system can increase efficiencies in ways such as repurposing resources in a distribution network, e.g., using the processes of FIG. 5A and the energy optimization component 700 of FIG. 7 as described above. In some examples, a system such as system 300 in FIG. 3 can repurpose resources using the energy optimization component 700 of FIG. 7. For example, based on information from cost determination component 705 and device component 702, scheduler 701 can implement pricing mechanisms to encourage or discourage certain use of resources in a manner consistent with an adaptive energy system disclosed herein. In some examples, to more efficiently allocate resources throughout a day, scheduler 701 can further use information from priority component 702 to determine delivery through the use of resources at off peak times. Based on these determinations, users can be encouraged to select such off peak delivery by being offered higher throughput and/or lower prices during that time, and users can be discouraged to do so at peak times by being allowed lower throughput and/or charged higher prices during peak times. Similarly, lower priority jobs, such as encoding or building Video On Demand ("VOD") libraries, could be scheduled to take place off peak, where a server dedicated to VOD applications (e.g., at content source 301 in system 300 of FIG. 3) could transcode new VOD or new television programs during a downtime and queue them up for transmission (e.g., in the network 302) the next week. A list of resources, e.g., from device component 702, could also be provided to scheduler 701 and scheduled for the available jobs during the downtime of those resources, e.g., where downtime can be determined by the scheduler 702 based on information from priority component 702. In this way, the burden on resources during peak hours is reduced and an unexpected increase in service demand can be more easily met. Additionally, resources that may be required to remain powered on during off peak to address unexpected service demands can be more efficiently utilized. Thus, an adaptive energy system can use energy optimization component 700 to optimize energy usage by powering down and repurposing resources, so as decrease overall power consumption and decrease resource use fluctuations, and thus, reduce overhead.

Repurposing resources can also be applied across a country or globally. For example, in a country-wide network or in an international network, when users in one region of the country or world experience peak demand, then network resources for that user can be reallocated to more resources from other regions experiencing off peak hours. By way of example, in the United States, a service demand curve typically resembles a wave that goes from East to West across the country. That is, service demands are not steady in a static window of time, but rather, typically fluctuate as the Earth turns. Thus, a system or portion thereof may have compute power doing real time encoding and packaging for linear channels at a peak time of the day and then, when the demand for live television falls off in the middle of the night, some of those resources could be used for other tasks, such as encoding for VOD applications. For systems serving multiple locations around the world, resources could be reallocated from one country or region to another, such that more resources can be allocated to a country or region experiencing a peak time and then reallocated elsewhere when off peak times occur.

Repurposing resources can also occur among partner companies. For example, a first company using a network in a first location could partner with a second company using a network in a second location, where the first and second locations may be in a different region or country. When the first company experiences low service demands in an off peak time, it could share its resources with the second company that may be experiencing high service demands in a peak time. Similarly, the second company could share its resources to the first company during an opposite time of low service demand for the second company and high service demand for the first company. Such partnering could also be implemented without respect to locations, as a backup measure to ensure users of partner companies will have access to their respective systems. Additionally or alternatively, partnering could include sharing applications, such as for system optimization, where partners could use and modify the shared applications for its particular environment to allow for further optimization. As use of resources moves from one network to another, different applications can be used and modified to optimize resource use in a roaming type of arrangement.

Figure 8:
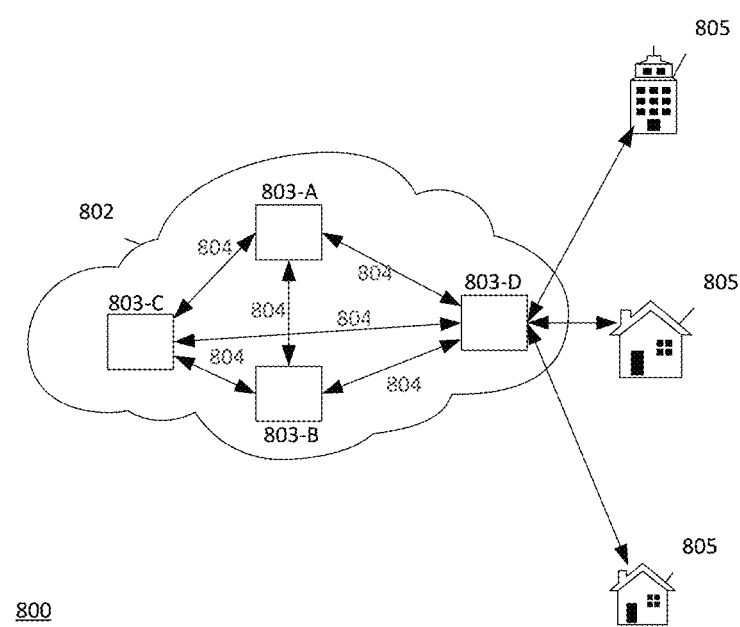
FIG. 8 shows a high-level diagram of an exemplary system, including an energy distribution system, in which various features described herein may be used.

Energy Distribution Optimization:

In at least some examples, an adaptive energy system may be implemented in connection with an energy distribution system, such as shown in FIG. 8, comprising energy optimization component 700 of FIG. 7. System 800 may be an energy distribution system comprising a network 802 of a plurality of nodes 803 (e.g., shown as 803-A to 803-D), interconnected by links 804, for distributing energy to premises 805. Nodes 803 can include energy sources (e.g., power plants), energy distribution devices that couple a premise 805 to an energy source, and energy control devices involved in controlling distribution of energy to a premise 805. Energy optimization component 700 of FIG. 7 can be implemented at one or more nodes 803 or premises 805 in the network 802 to optimize the distribution of energy in the system 800.

Using the methods described herein, fluctuations in local prices (e.g., from cost determination component 705), availability (e.g., from energy consumption component 704), and demand of electricity (e.g., from priority component 702) can be monitored by scheduler 701 and information gathered from this monitoring can be used to determine a more efficient or cost-effective way to distribute or use energy in system 800 using available resources at nodes 802 (e.g., based on information from device component 802). For example, if there is a heat wave in one region and energy prices start to spike, as reflected by information from cost determination component 705, a system or portion thereof could use scheduler 701 to transition resource use from grid power at node 803-A to back up power at node 803-B (e.g., using information from device component 702 and energy consumption component 704) to save money based on a changing utility rate. As another example, if a local power grid at node 803-D has a history of brown outs at certain times of the year, then the scheduler 701 can anticipate the brown out by configuring a system to obtain access to energy resources out of the local area at node 803-C in advance of the brown out in order to preserve the user experience. Similarly, if an area experiences frequent power outages or if reductions in energy budgets are anticipated for a period of time at a particular location, scheduler 701 can use such information (e.g., from cost determination component 705) to configure a system to access back up power such as in the form of battery or solar panel systems (e.g., based on information from device component 702 and energy consumption component 704) in advance of the need for such power. Other examples include remote areas or in certain areas where the grid is already oversubscribed. Situations such as these demonstrate that energy distribution optimization may be critical in order to even deliver services, let alone conserve resources. Thus, an adaptive energy system can utilize scheduler 701 in an energy distribution system 800 to optimize not only from a cost-perspective, but also from an access perspective, ensuring that the energy is available at a location at any given time.

Additionally, an energy distribution system 800 can be configured to operate more efficiently, e.g., using the processes of FIG. 5A and the energy optimization component 700 of FIG. 7 as described above. For example, cost determination component 705 can include a database or other storage device at a node 803 or user premise 805 to provide real-time or near real-time information on power rates, cost of those rates, and source of those rates. This information can then be used by scheduler 701, e.g., in connection with steps 502-A to 506-A of FIG. 5A, to determine which energy sources (e.g., where an energy source can be identified as a device provided by device component 702) should be used for various service demands (e.g., service request 502-A in FIG. 5A) from a premise 805. A network 802 that is configured to access this information can also determine to use energy from, or supply energy to, various sources (e.g., nodes 803-A to 803-D). For example, energy stored in a network could be supplied to a region experiencing energy cost spikes, and energy located in a region having low power rates could be sourced to a network in another region having higher local power rates. In the same way, network operations requiring energy, such as use of servers, can be reallocated (e.g., in steps 503-A and 504-A) from sources of higher energy costs to sources of lower energy costs, such as directing operations to occur on servers in the lower energy cost region upon a determination that an improvement in energy savings is possible (e.g., in steps 505-A and 506-A). As an example, transcoding functions and other computing intensive functions could be distributed so as to require power from the location of least cost. In this way, power-intensive operations can be redistributed not only based on current demand, as described elsewhere herein, but also or alternatively based on lowest power costs. This resource allocation can be based on a lowest total cost of the operation, or a lowest cost of some subset of operations. At a lower level, if some data centers have a lower cost per byte of transcoding, work can be redistributed to those data centers from a location having a higher cost of processing the same number of bytes.

An adaptive energy system as described herein can also be configured within a system that distributes power. For example, network 802 in FIG. 8 can be a network that may supply power to devices (e.g., at nodes 803-A to 803-B) down through the network, e.g., powering downstream nodes. To the extent that such a system is also a power distribution system in this way, it can be configured to select and distribute its power, or use backup resources within that network, in a cost-effective manner as described herein. For example, the system could select the most optimum place to buy that power (e.g., using information from cost determination component 705) to distribute that power within the system and to store for later use. Further, the system can locate battery resources during peak hours that also correspond to peak hours of the system. Depending on a cost-benefit curve, it is possible that the system could provide cost-savings that cover the cost of the batteries by using more battery power during peak times of higher cost energy (and thus, drawing lower external power), and using external power at off peak times of lower cost energy to charge the batteries. Additionally or alternatively, the batteries could be charged by solar power, reducing requirements for external power. Depending on external energy costs and battery costs, the system could be further configured to sell power back to the grid, a micro grid, or other external system, e.g., during peak times of higher cost energy. Batteries that are powered down in accordance with an adaptive energy system disclosed herein may be especially suited for selling power to an external system.

Importantly, as part of the above resource determinations, QoS and QoE should be measured and maintained at levels satisfactory to users. Accordingly, while a system can allocate resources to use lower cost energy, it may not be able to select the cheapest sources of energy if those sources have too much of a negative impact on the user experience. For example, if a region having the least cost energy is unable to supply energy to a system without incurring significant disruption in service, then that region may not be selected as an energy source for the system. A threshold can be determined such that if reallocating operations causes QoS and QoE issues beyond a predefined point, such as lag and jitter in video displayed at a user's content device that deteriorate a user experience, then reallocation is reversed or canceled to ensure that the user experience is maintained.

Predictive Modeling:

A cable system could employ machine learning techniques to utilize inputs, such as energy usage metrics 401, service demand metrics 402, and QoS and QoE metrics 403 described with respect to FIG. 4, to predict system behavior and maintain the optimal balance between lowering energy consumption and preserving the user experience. Since dirurnal and seasonal fluctuations in service demand may follow patterns, as discussed above, applications that access historical service demand data can predict service demand fluctuations and effect energy controls, while monitoring QoS and QoE metrics to ensure the user experience is not impacted. For example, in VOD systems, latency can be a significant factor in the user experience. If it takes a long time to power up another VOD system, and the time of day is approaching a timeframe where demand typically increases, it may be necessary to power on the VOD system at least shortly before this anticipated demand increase so that latency does not rise as well. To address this and other service-related issues, a predictive algorithm or model can enable the system to consider the history of usage and make predictions about service demands, as opposed to responding to service demand changes real time.

A scheduler 701 in an energy optimization component 700 described herein can use predictive modeling that can access real-time or near real-time, time-series data in addition to a history of that data (e.g., from elements 702-705), to recognize patterns in usage, as shown and described further below with respect to FIG. 9. At step 901, the predictive modeling begins, and at step 902 system resources are analyzed. In particular, resource analysis can include identification of all devices in the system and current utilization of each device, such as how much energy the device is consuming and whether the device can increase its utilization (e.g., process more streaming video signals, receive more Internet traffic, or transmit more television programs). The system can analyze resources in order to determine what settings can be adjusted to optimize a user experience, while still reducing or minimizing energy usage.

Next, at step 903, energy usage metrics, service demand metrics, and QoS and/or QoE metrics can be generated based on events and measurements in the system. For example, the number of rebuffering events at a device for displaying content can be determined, such as at a set-top box for displaying streaming video on a television, which can be an indication of connectivity problems or network lag. As another example, average bandwidth per time period for a device can be determined, such as at a router used for Internet communications, which can be an indication of whether the router has capacity to deliver more data or whether additional routers should be activated to accommodate service demand. As yet another example, a number of playback attempts can be determined, such as by a set-top box or a DVR for VOD programs, which can be an indication of whether more resources should be allocated to meet a user's level of service demand. These determinations, and any of the additional examples described below with respect to Table 2, can be used to generate QoS and/or QoE metrics for the current system configuration.

Next, at step 904, predictions for service demands and associated energy usage can be determined based on the QoS and/or QoE metrics as well as historical data. Historical data can be provided by a historical data source 905, such as a database or any other form of memory. In some examples, when service demand and corresponding energy usage starts ramping up and the system enables more resources to handle it, things like the latency of how long it takes to power something up in order to establish new service loads can be taken into account in advance to maintain the user experience and/or reduce energy usage. Likewise, instead of just responding in real-time as demand starts to drop after peak hours, the onset of off peak is a predicable phenomenon and can be anticipated in advance. A scheduler 701 using a predictive modeling application as a whole can start building a history, stored in historical data source 905, in order to predict and then further optimize. So, instead of responding in real time and exercising an algorithm that is trying to be very dynamic to the real time signals, a system can also take advantage of what is known about the history of the network in order to potentially anticipate what is happening and therefore do a better job of preparing and exercising those controls. Using predictive modeling, at step 904, a scheduler 701 in an adaptive energy system can be configured to be smart enough to know the topology of a network and, based on this knowledge, be able to control it, at step 906, such as by allocating resources. For example, a system can have the capability to identify all available resources in a network, from step 902, and dynamically configure and reconfigure them, at step 906, in the most cost effective and energy efficient way across the network. If peak demand for streaming video is anticipated from step 904, then at step 906 the system can increase power or activate more communication devices 303, such as routers and servers, to accommodate the expected increase in demand before it occurs. As another example, if one method of content delivery (e.g., via a modem connected to the Internet) is predicted from step 904 to experience problems cause by a reduced bandwidth for a user, then at step 906 another method of content delivery (e.g., via an STB connected to a cable line) can be configured for that user to continue delivery of content without experiencing a decrease in quality of the content. As yet another example, if predicted usage for Internet service is expected to decline (e.g., overnight), at step 906 the system can decrease power or deactivate unnecessary equipment during an expected low demand period. Optimization described herein can also maintain the user experience, based on changing inputs, such as energy usage metrics, service demand metrics, and QoS and/or QoE metrics from step 903. After system resources are allocated according to step 906, data relating to the allocation (e.g., identification of devices in use, energy consumption of devices, or utilization rate of devices) can be provided to update the historical data source 905 at step 907. The system then can determine whether to continue energy optimization based on predictive modeling at step 908, and either continue at the analysis step 902, or end at step 909.

Predictive modeling, such as at step 904, can also anticipate seasonal or time-based geographical changes in service demand. For example, locations with seasonal peak times, such as at the beach in the summer or at a ski resort in the winter, may require more resources than at the same time for other locations. Similarly, one geographic region may be experiencing peak hours at the same time that another geographic region is experiencing off peak. Using the processes of FIG. 5A, the energy optimization component 700 of FIG. 7, and the energy optimization based on predictive modeling of FIG. 9 as described above, predictive modeling can account for these variations in service demand by reconfiguring a system (e.g., systems 100, 300, and 800) to make optimal use of available resources at any given time. Service demand fluctuations can be modeled and predicted, and in response, resources can be allocated accordingly across a network.

Predictive modeling can also account for unique events. For example, after an issuance of new building permits, it can be expected that service demands in the area of the new building are likely to increase upon arrival of new tenants. Using predictive modeling, a network in the area of the new building can be configured in advance of the anticipated service demand increase to accommodate it by the time of the expected increase. Similarly, predictive modeling can be used to configure a network in advance of anticipated high demand events, such as the Olympics, the Super Bowl, or other global, national, or regional events of interest, to ensure the user experience is maintained. Information about known events such as described above, either anticipated or already occurring, can be stored with historical data in the historical data source 905 and used at step 904 to predict system usage and, in turn, addressed in step 906 in the allocation of resources.

Predictive modeling can be implemented, e.g., using a software defined network ("SDN") or network functions virtualization ("NFV"), such as described with respect to FIGS. 5A and 7 above. A virtualization layer can be used for network routing, or service flow optimization, that relies upon various real-time data and knowledge of a network topology. Such data can include information in address tables and routing tables. Software can access and modify these tables so as to dynamically reconfigure the network topology to select paths that are lowest cost, lowest energy, highest QoS and QoE, or some combination thereof, in order to maximize energy savings across the network in a way that dynamically takes into account various real world, evolving constraints, while maintaining the user experience. Exemplary applications include, but are not limited to, optimizing entire signal paths for service flows of high-speed data, VOD, or linear video. An adaptive energy system described herein may also be implemented in conjunction with existing software defined networking to provide improved optimization while maintaining the user experience.

CMTS/CCAP:

In at least some examples, a Cable Modem Termination System (CMTS) may bridge signal flows from a cable fiber network to a co-axial access network that delivers service to homes and businesses. With respect to FIG. 3, an NID (e.g., 303-D) may comprise a Converged Cable Access Platform device (CCAP) or any other hardware appliance to bridge content devices 306. For example, a CCAP can bridge between an Internet Protocol-based fiber portion of a network 302 and an RF Quadrature Amplitude Modulation ("QAM") co-axial network going to user premises 305. In at least some examples, when service demand decreases, certain ports of a CCAP can be powered down to conserve energy, while ensuring that the user experience is maintained, e.g., by performing steps described above with respect to FIGS. 5A, 7, and 9. Servers (e.g., at 301) can include an energy management server, such as a policy server, that provides information about the QoS and QoE that is promised and delivered to each of the end users. To the extent the energy management server has control of a cable modem termination system, certain components could be powered down, e.g., corresponding to certain frequency bands or certain ports, at certain times, and therefore increase overall energy efficiency without negatively impacting the quality of experience for the users left on the system. In addition, at least some servers, load balancers, or other devices could be shut down at times of low service demand to further conserve energy. VOD or other cache services could also be transferred from an outer portion of the network, such as at an end node, to further upstream, possibly all the way up to a head end or a central distribution plant, at times of low traffic and/or low latency. Because there can be interactions and dependencies along an entire signal path, an adaptive energy system described herein can be applied to an entire topology, such that controls can affect the entire signal path for service flow, e.g., for linear, video, high-speed data.

RF Amplifiers:

Some examples may include Radio Frequency ("RF") amplifiers at or near some of the communication devices (e.g., 303). For example, RF amplifiers may be deployed across a cable footprint, e.g., on the order of millions or more, to support the delivery of cable services to user premises 305. At times of relatively low service delivery the bias current that is used to power the RF amplifiers may be attenuated to reduce power consumption. Such operations can include operations described above regarding CMTS/CCAP, and the processes described above regarding FIGS. 5A and 7. RF amplifiers may be controlled to reduce power consumption via an external controller application or via internal controls. The controller can measure service demand, and when service demand reduces to a certain level, the controller can modulate the bias current that powers the RF amplifier and that sends power down the line past the RF amplifier. Communication devices can support APSIS interfaces to allow external applications to monitor energy usage and service demand in connection with the controller attenuating the bias current. In this way, energy usage monitoring can also factor in QoS and QoE metrics from other elements of the network to ensure that current attenuation is not made to a degree that negatively affects the user experience.

The RF amplifier operations described above can be implemented on a large scale, such as for all RF amplifiers across a network, or on a local level, such as near a user premise (e.g., 305). For example, a user premise having content devices (e.g., 306) coupled to an NID (e.g., 303-D) in an area that is relatively remote from other devices (e.g., at another premise 305) in a network (e.g., 300) may require an RF amplifier to maintain the user experience. The RF amplifier can be controlled, e.g., using the processes of FIGS. 5A and 9 and the energy optimization component 700 of FIG. 7 as described above, to operate at times when a particular user accesses content, such as in the evening, on weekends, or only during part of the year, e.g., if the premise is not used as a primary residence. If the premise is an office, then content delivery may only be necessary during weekday business hours. A user could also provide its schedule of desired access, such as via software installed on a local device or via a website on the Internet, to ensure seamless operation during those times while conserving power at other times. Other mechanisms for controlling RF amplifiers could include external triggers, such as engaging a garage door remote control, unlocking an electronic door lock, or activating a home security system, from devices that are accessible to a network, such as via the Internet. At known or likely times of access, an RF amplifier can remain fully powered to maintain the user experience, but at other times it can be powered down. In this way, an adaptive energy system can account for an individual user's pattern of use to control an RF amplifier in a manner that conserves energy while maintaining the user experience at the desired times.

Figure 9:
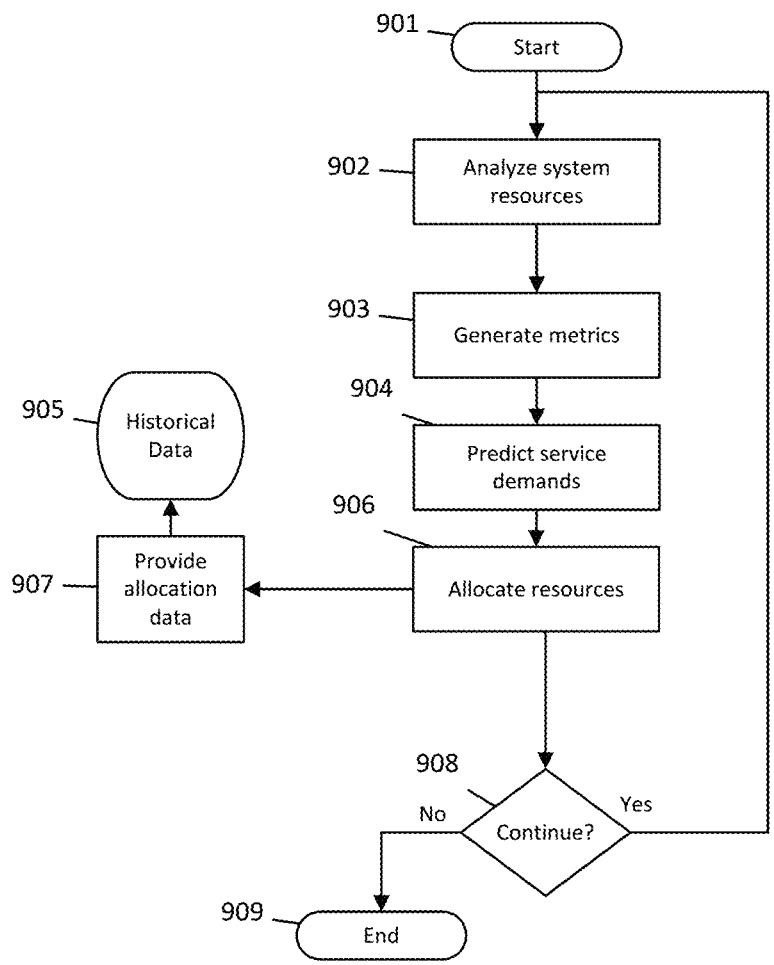
FIG. 9 shows a flowchart summarizing processes for predictive modeling in an adaptive energy system such as described herein.

An RF amplifier can also be configured to enter a low power state, instead of fully powering down, to ensure service availability upon an unexpected service demand, e.g., using the processes of FIGS. 5A and 9 described above. For example, during periods of user inactivity or anticipated inactivity, an RF amplifier can enter a low power state, or sleep mode, while continuing to periodically monitor for a service demand by momentarily awakening. Upon receiving an indication of a service demand, the RF amplifier can return to a full power mode. The level of low power state can also vary depending on the time between the last indication of a service demand. For example, during longer periods of user inactivity, a longer time may pass before an indication for a service demand will awaken the RF amplifier, whereas during shorter periods of user inactivity an intermediate power state may be entered during which more frequent polling checks are made for indications of service demand, so as to minimize latency. An RF amplifier can also be controlled by a watchdog timer that powers down, e.g., for a certain number of seconds, and wakes up for a shorter period, e.g., on the order of microseconds, to send a poll and power down if no response is received. The length of time for periods could also be adjusted, e.g., based on anticipated service demands of a user.

RF amplifiers may be controlled in any manner described above, for power management and network configuration, via any communication method, including, e.g., via wireless and wired communications. In at least some examples, power management and network configuration can be a wireless overlay on top of a distribution network. This may take the form of a transmission layer, a communications stack, an IP stack, and applications configured to communicate with external controllers. RF amplifiers can be modified to be configured in the manner described above for integration in a software controlled network in accordance with the adaptive energy system described herein.

VOD:

Some examples may include Video On Demand ("VOD") service. Cable systems may provision large number of storage devices and video servers (e.g., servers 105-107 in FIG. 1, or at 301 in FIG. 3) to support the peak load on a VOD service. An energy optimization component 400 in FIG. 4 can orchestrate service requests to access a minimum set of resources in a network (e.g., 100 or 300) to meet real-time user demands from content devices (e.g., 306) that can advantageously reduce overall power consumption in the network, e.g., using the processes of FIGS. 5A and 9 as described above. An energy optimization component 400 also can monitor QoS metrics from the entire VOD signal path (e.g., from a user network to a backoffice network), as well as QoE metrics from communication devices (e.g., 303) and/or content devices (e.g., 306). An energy optimization component 400 can operate to reduce VOD service power consumption to the maximum degree without disrupting the user experience in accordance with an adaptive energy system described herein.

VOD service can be controlled across an entire service path, as well as across an entire network. Processes for such control can be applied throughout a network, including in encoding, storage, and content delivery to user premises. Additionally, these process can be applied to other services such as high-speed data, linear video, and cloud-based content delivery. In at least some examples, a plurality of services can be offered to users across a network, with each service having associated resources and power requirements. Depending on, e.g., service demands and locations of services and resources, various resources can be powered on and off in an efficient manner while preserving the user experience. Additionally, network topology of a software configurable network can be dynamically controlled to redistribute loads during off peak hours and then increase resource allocation in peak hours, thereby dynamically providing desired resources for each respective user load while satisfying minimum QoS and QoE requirements.

Other Applications:

In addition to the exemplary applications described above, the examples, features, and processes described herein can be applied to any environment, including those having a robust data ingest and repository platform. Implementations can include technology such as Kafka at an ingest, and a Hadoop Distributed File System (HDFS) to repose data comprising time series data around real time energy metrics. Distributed computing platforms such as Spark using Go, Scala, or Java can be used to write various applications to measure, characterize various aspects in a system, and implement different controllers or policy engines. An environment could include an application that can increase in complexity, with capability to innovate at the application layer, as data is received. Ultimately, an infrastructure can be built that can manage large quantities of data as well as support a variety of applications. In addition, applications can be portable across service providers, such that one or more vendors could utilize a framework to develop applications for use by multiple service providers or a service provider could provide applications to external partners.

The following Table 2 includes exemplary measures for QoS and QoE metrics discussed above. In some examples, each of the QoS metrics can relate to whether a user is able to access content as a threshold matter. For example, an unacceptably low QoS metric relating to bitrate (e.g., highest bitrate, average bitrate, bitrate change) could result in the user being unable to access content altogether. In some examples, each of these QoS metrics can also correspond to QoE metrics. For example, a QoS metric (e.g., relating to errors) associated with a user's request for content can be acceptable from an access standpoint (e.g., such that a user is able to access content despite occasional errors, and thus, resulting in acceptable QoS) while at the same time being unacceptable as a QoE metric from a quality of experience standpoint (e.g., occasional errors that disrupt the viewing experience may result in an unacceptable QoE). Accordingly, depending on context, a metric can apply as one or both of a QoS or QoE metric, such as shown in Table 2 and described further below.

TABLE 2

| Exemplary QoE Metrics | Exemplary QoS Metrics |
| --- | --- |
| Latency | Bitrate Change |
| Startup Latency | Bitrate Increase |
| Trick Play Latency | Bitrate Decrease |
| Trick Play Speed Latency | Bitrate Usage Distribution |
| Fast Forward Trick Play Latency | Highest Bitrate |
| Rewind Trick Play Latency | Highest Bitrate Duration |
| Pause Trick Play Latency | Average Bitrate |
| Bitrate Change | Rebuffering Events |
| Bitrate Increase | Rebuffering Time |
| Bitrate Decrease | Rebuffering Ratio |
| Bitrate Usage Distribution | Time Between Rebuffering Events |
| Highest Bitrate | Average Bandwidth Change |
| Highest Bitrate Duration | Average Bandwidth per time period |
| Average Bitrate | Channel Uptime |
| Rebuffering Events | Switch Over Time |
| Rebuffering Time | Failure Events |
| Rebuffering Ratio | Resource Utilization |
| Time Between Rebuffering Events | Mean Time Between Failure |
| Average Bandwidth Change | Recording Failure Mean Time to Resolution |
| Average Bandwidth per time period | Outage Mean Time to Resolution |
| Channel Uptime | Mean Time between Errors |
| Freeze Frames | Number of Errors |
| Switch Over Time | Fatal Errors |
| Failure Events | Time to Relief |
| Failed Fragments | Playback Attempts |
| Transcoder Failover | Streaming Capacity |
| Viewing Time | V-Factor |
| Playback Duration | User Engagement Level |
| Playback Concurrency | Image Entropy |
| Lip Sync | Channel Security |
| Resource Utilization | Service Success Rate |
| Mean Time Between Failure | |
| Recording Failure Mean Time to Resolution | |
| Outage Mean Time to Resolution | |
| Mean Time between Errors | |
| Number of Errors | |
| Fatal Errors | |

TABLE 2-continued

| Exemplary QoE Metrics | Exemplary QoS Metrics |
| --- | --- |
| Non-Fatal Errors | |
| Reboot Errors | |
| Pixelization | |
| Color Distortion | |
| Blurriness | |
| Jitter | |
| Dropped Packages | |
| Audio Loudness | |
| Ringing | |
| Error-Free Recorder Playbacks | |
| Error-Free VOD Playbacks | |
| Error-Free Linear Playbacks | |
| Time to Relief | |
| Playback Attempts | |
| Streaming Capacity | |
| PSNR | |
| V-Factor | |
| JND | |
| NPS | |
| User Engagement Level | |
| Image Entropy | |
| Channel Security | |
| Iframes | |
| Service Success Rate | |
| Highest Resolution/Profile Achieved | |

QoS and QoE metrics are described further as follows.

Latency refers to the time between when a viewer indicates that it wants to view content, and the time at which the content starts presenting. Startup latency refers to a delay upon initiating a service, whereas other latency concerns delays during a service, such as the time it takes to view a new channel after a user changes it. As examples, it can be less than a second or over two seconds to present content. IP video platforms typically experience some form of latency. Quadrature Amplitude Modulation ("QAM") set-top boxes also experience latency between when a user changes a channel and is able to view the content. User perceptions can differ as to what amount of delay is acceptable and what amount is too long. Users also can have different expectations on one device, e.g., a mobile phone, than they may have on another device, e.g., a set-top box. While there is no specific amount of time found to be generally acceptable, overall, low latency is desired. Steps to reduce latency can include, e.g., increasing power at a device, or reallocating resources used for transmission to a device.

Trick play latency refers to a measure of delay associated with user controlled events. Specific latencies can be measured, such as time delays between user selection and implementation of functions such as pause, restart, rewind, fast forward, and speed of play.

Bitrate refers to the rate at which bits are communicated. A bitrate can change, either increase or decrease, to improve a user experience or conserve resources. For example, on start-up of a set-top box, the bit rate could be reduced, and as a buffer is filled the bitrate could be increased to improve resolution of the content on a user device. In this way, a bitrate can be adaptive. An optimal bitrate for a network may not necessarily be an optimal bitrate for a user viewing experience.

Rebuffering can occur when a buffer becomes exhausted. For example, when content is being viewed, data fragments are being pulled from a buffer in order to ensure smooth playback. If network lag or connectivity issues arise, data can be pulled from the buffer faster than the buffer refills, requiring rebuffering. During rebuffering, the bitrate may be reduced to fill the buffer as quickly as possible.

Average bandwidth refers to a measure of actual bit rate over a gateway. An average bandwidth change refers to a measure of continuity of the actual bandwidth over time. Data delivered to an individual terminal is influenced by how much data is pulled in aggregate from an upstream node. During peak consumption, there may be more contention for bandwidth than is available at a node, and bandwidth may potentially suffer. Average bandwidth per time period refers to a sliding window measure of bandwidth.

Channel uptime refers to the time at which an actual linear channel has been continuously available. For example, a disruption in service could occur, and channel uptime can reflect such disruptions.

Freeze frame refers to a user experiencing a momentary freeze of an image on a content device. This can occur, e.g., during rebuffering. A metric relating to freeze frame can include a number of freeze frame occurrences during a time period, a duration or average duration of time during which an image appears frozen on a user's device, or any other measurement relating to the momentary freezing of an image on a content device.

Switch over time refers to the time between switching from one linear service to another.

Failure events refers to a measure of all errors that occur within a content device that indicate a failure has occurred. Failed fragments refers to the failure of requested data fragments to arrive. Transcoder failover refers to a measure of failure at a transcoder.

Viewing time refers to a measure of continuous time viewing a linear presentation, and playback duration refers to a measure of continuous time viewing a VOD presentation. Playback concurrency refers to a measure relating to two viewing experiences on the same content device, such as with picture-in-picture.

Lip sync refers to a measure of audio and video synchronization. Within a certain tolerance, a lack of synchronizations becomes noticeable by a viewer.

Resource utilization refers to a measure of the use of resources, either locally or across a network. Local resources can include, e.g., memory or power resources at a set-top box. Network resources can include device utilization and availability, e.g., availability of VOD servers.

Mean time between failure refers to a measure of a failure such as a recording failure. Recording failure mean time to resolution refers to a measure of time required for resolving a recording failure. Outage mean time to resolution refers to a measure of time for resolution of an outage, such as loss of access to content or loss of power.

Number of errors refers to a measure of a number of occurrences in the network or at a local device that negatively impact the user experience. These can be fatal errors, such total power loss or total loss of viewing of requested content, or non-fatal errors such as momentary pixelation, blurriness, jitter, color distortion, dropped packages, or audio quality, such as loudness or presence of ringing. Reboot errors refers to a measure of errors that require a device reboot. Mean time between errors refers to a measure of time between errors. Time to relief refers to a measure of time for resolving issues such as errors.

Error-free recorder playbacks, error-free VOD playbacks, and error-free linear playbacks refer to measures relating to error-free viewing of previously recorded video, VOD content, and linear programming, respectively. Playback attempts refers to a measure of attempts by a user to view certain content.

Streaming capacity refers to a measure of capacity for viewing streaming content at a content device.

PSNR, or Peak Signal to Noise Ratio, refers a measure of quality of a video or frames of a video. V-Factor, or velocity factor, refers to a measure relating to transmission speed in a network.

Image entropy, Iframes, JND (or "Just Noticeable Differences"), and NPS (or "Noise Power Spectrum") refer to measures relating to the quality of a video apparent to a viewer, such as resulting from compression of images in the video.

User engagement level refers to a measure of engagement of a user. Channel security refers to a measure of security of a channel in a network. Service success rate refers to a measure of successful reception and viewing of requested content. Highest resolution per profile achieved refers to a measure of a highest level of resolution achieved with a user profile.

The above QoS and QoE metrics are provided for example only, and any other metrics relevant to a particular system can be used in an adaptive energy system disclosed herein.

Although example examples are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A system comprising:
a first communication device; and
a first content device,
wherein the first communication device comprises:
one or more processors; and
memory storing instructions that, when executed by the one or more processors of the first communication device, cause the first communication device to:
predict, based on historical demand for content, future demand fluctuations for the content;
determine, based on the predicted future demand fluctuations for the content and based on energy consumption levels of a plurality of second communication devices configurable to communicate content to the first content device, a combination of second communication devices;
initiate sending, via the second communication devices of the combination, the content to the first content device;
receive, during the sending of the content, data indicating a plurality of errors in a display of the content via the first content device;
determine, based on the plurality of errors, a downward trend in a quality of the display of the content via the first content device;
adjust, based on the determined downward trend, energy consumption levels for one or more of the second communication devices of the combination;

select, based on the determined downward trend, a second content device to receive and to display the content;

suspend an action, of a user device, that is determined as causing at least one of the plurality of errors in the display of the content via the first content device; and allow, after the second content device completes display of the content, the action to resume; and wherein the first content device comprises:
one or more processors; and
memory storing instructions that, when executed by the one or more processors of the first content device, cause the first content device to:
receive, from one or more of the second communication devices of the combination, the content;
determine, during the display of the content, the plurality of errors; and
send the data indicating the plurality of errors.

2. The system of claim 1, wherein the instructions stored in the memory of the first communication device, when executed by the one or more processors of the first communication device, cause the first communication device to determine the combination by causing the first communication device to:
select the combination such that a combined energy consumption level of the combination satisfies an energy consumption threshold.

3. The system of claim 1, wherein the instructions stored in the memory of the first communication device, when executed by the one or more processors of the first communication device, further cause the first communication device to:
determine that the quality does not satisfy a quality threshold;
select, from the plurality of second communication devices, a second combination of second communication devices that is different than the combination; and
initiate sending, via the second communication devices of the second combination, the content to the second content device for display.

4. The system of claim 1, wherein the instructions stored in the memory of the first communication device, when executed by the one or more processors of the first communication device, further cause the first communication device to:
determine content viewing characteristics of users associated with the first content device; and
adjust, based on the content viewing characteristics, energy consumption levels for one or more of the second communication devices of the combination.

5. The system of claim 1, wherein the instructions stored in the memory of the first communication device, when executed by the one or more processors of the first communication device, further cause the first communication device to:
adjust, based on determining whether one or more users are present in a premises associated with the first content device, energy consumption levels of one or more of the second communication devices of the combination.

6. The system of claim 1, wherein the instructions stored in the memory of the first communication device, when executed by the one or more processors of the first communication device, further cause the first communication device to:

receive an indication of an energy consumption level of a second user device; and
adjust, based on the energy consumption level of the second user device, energy consumption levels of one or more of the second communication devices of the combination.

7. The system of claim 6, wherein the second user device comprises one or more of an air conditioner, a furnace, a heater, a fan, a dishwasher, a washing machine, a dryer, a microwave, an oven, a refrigerator, or a freezer.

8. The system of claim 1, further comprising:
based on a determination that the quality does satisfy a quality threshold, decrease energy consumption levels for one or more of the second communication devices of the combination such that a future quality of the display of the content is lower than the quality but still satisfies the quality threshold.

9. The system of claim 1, wherein the plurality of errors in the display of the content via the first content device comprises one or more of pixelation, blurriness, jitter, or color distortion.

10. The system of claim 1, wherein the instructions stored in the memory of the first communication device, when executed by the one or more processors of the first communication device, cause the first communication device to:
determine a second user device causing at least one of the plurality of errors in the display of the content via the first content device, wherein the second user device is incapable of sending, receiving, and displaying the content; and
power off the second user device.

11. The system of claim 1, wherein the instructions stored in the memory of the first communication device, when executed by the one or more processors of the first communication device, cause the first communication device to:
send, via a wired network, the content to the first content device; and
send, via a wireless network, the content to the second content device.

12. The system of claim 1, wherein the instructions stored in the memory of the first communication device, when executed by the one or more processors of the first communication device, cause the first communication device to predict the future demand fluctuations for the content by causing the first communication device to:
predictively model seasonal changes and geographically-based changes in the future demand fluctuations for the content.

13. The system of claim 12, wherein the predictively modeled seasonal changes and geographically-based changes in the future demand fluctuations for the content are based on one or more machine learning techniques.

14. A method comprising:
receiving, by a first communication device, content comprising one or more of video, audio, or data;
predicting, based on historical demand for the content, future demand fluctuations for the content;
determining, based on the predicted future demand fluctuations for the content and based on energy consumption levels of a plurality of second communication devices configurable for communicating the content to a first content device, a combination of second communication devices;
initiating sending, via the second communication devices of the combination, the content to the first content device;

receiving, during the sending of the content, data indicating a plurality of errors in a display of the content via the first content device;
determining, based on the plurality of errors, a downward trend in a quality of the display of the content via the first content device;
adjusting, based on the downward trend, energy consumption levels of one or more second communication devices of the combination;
selecting, based on the determined downward trend, a second content device to receive and to display the content; and
suspending an action, of a user device, that is determined as causing at least one of the plurality of errors in the display of the content via the first content device; and
allowing, after the second content device completes display of the content, the action to resume.

15. The method of claim 14, wherein the determining the combination comprises:
selecting the combination such that a combined energy consumption level of the combination satisfies an energy consumption threshold.

16. The method of claim 14, further comprising:
determining that the quality does not satisfy a quality threshold;
selecting, from the plurality of second communication devices, a second combination of second communication devices that is different than the combination; and
initiate sending, via the second communication devices of the second combination, the content to the second content device.

17. The method of claim 14, further comprising:
determining content viewing characteristics of users associated with the first content device; and
adjusting, based on the content viewing characteristics, energy consumption levels of one or more of the second communication devices of the combination.

18. The method of claim 14, further comprising:
adjusting, based on determining whether one or more users are present in a premises associated with the first content device, energy consumption levels of one or more of the second communication devices of the combination.

19. The method of claim 14, further comprising:
receiving an indication of an energy consumption level of a second user device; and
adjusting, based on the energy consumption level of the second user device, energy consumption levels of one or more of the second communication devices of the combination.

20. The method of claim 19, wherein the second user device comprises one or more of a television, a Set-Top-Box, a Digital Video Recorder, a computer, an air conditioner, a furnace, a heater, a fan, a dishwasher, a washing machine, a dryer, a microwave, an oven, a refrigerator, or a freezer.

21. The method of claim 14, further comprising:
based on a determination that the quality does satisfy a quality threshold, decreasing energy consumption levels of one or more of the second communication devices of the combination such that a future quality of the display of the content is lower than the quality but still satisfies the quality threshold.

22. A system comprising:
a first communication device; and
a first content device,
wherein the first communication device comprises:
one or more processors; and
memory storing instructions that, when executed by the one or more processors of the first communication device, cause the first communication device to:
predict, based on historical demand for content, future demand fluctuations for the content by predictively modeling seasonal changes and geographically-based changes in the future demand fluctuations for the content;
determine, based on the predicted future demand fluctuations for the content and based on energy consumption levels of a plurality of second communication devices configurable to communicate content to the first content device, a combination of second communication devices;
initiate sending, via the second communication devices of the combination, the content to the first content device;
receive, during the sending of the content, data indicating a plurality of errors in a display of the content via the first content device;
determine, based on the plurality of errors, a downward trend in a quality of the display of the content via the first content device;
adjust, based on the determined downward trend, energy consumption levels for one or more of the second communication devices of the combination;
select, based on the determined downward trend, a second content device to receive and to display the content; and
wherein the first content device comprises:
one or more processors; and
memory storing instructions that, when executed by the one or more processors of the first content device, cause the first content device to:
receive, from one or more of the second communication devices of the combination, the content;
determine, during the display of the content, the plurality of errors; and
send the data indicating the plurality of errors.

23. The system of claim 22, wherein the instructions stored in the memory of the first communication device, when executed by the one or more processors of the first communication device, cause the first communication device to:
determine a user device causing at least one of the plurality of errors in the display of the content via the first content device, wherein the user device is incapable of sending, receiving, and displaying the content; and
power off the user device.

24. The system of claim 22, wherein the instructions stored in the memory of the first communication device, when executed by the one or more processors of the first communication device, cause the first communication device to:
send, via a wired network, the content to the first content device; and
send, via a wireless network, the content to the second content device.

25. The system of claim 22, wherein the instructions stored in the memory of the first communication device, when executed by the one or more processors of the first communication device, cause the first communication device to:

suspend an action, of a user device, that is determined as causing at least one of the plurality of errors in the display of the content via the first content device; and allow, after the second content device completes display of the content, the action to resume.

26. The system of claim 22, wherein the predictively modeled seasonal changes and geographically-based changes in the future demand fluctuations for the content are based on one or more machine learning techniques.

* * * * *

UNITED STATES PATENT AND TRADEMARK OFFICE
CERTIFICATE OF CORRECTION

| | |
|---|---|
| PATENT NO. | : 11,991,235 B2 |
| APPLICATION NO. | : 15/717556 |
| DATED | : May 21, 2024 |
| INVENTOR(S) | : Francis Sandoval |

Page 1 of 2

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

In the Specification

In the Detailed Description

Column 18, Line 36:
Delete "305" and insert --306--

Column 25, Line 51:
Delete "702)" and insert --703)--

Column 25, Line 66:
Delete "702)." and insert --703).--

Column 26, Line 44:
Delete "702" and insert --703--

Column 26, Line 61:
Delete "702" and insert --701--

Column 26, Line 62:
Delete "702." and insert --703.--

Signed and Sealed this
Thirteenth Day of May, 2025

Coke Morgan Stewart
*Acting Director of the United States Patent and Trademark Office*

CERTIFICATE OF CORRECTION (continued)
U.S. Pat. No. 11,991,235 B2

Column 28, Line 1:
Delete "702)" and insert --703)--

Column 28, Line 5:
Delete "802" and insert --803--

Column 28, Line 6:
Delete "802)." and insert --702).--